(12) United States Patent
Jueneman et al.

(10) Patent No.: US 8,009,829 B2
(45) Date of Patent: Aug. 30, 2011

(54) METHOD AND SYSTEM FOR DEPLOYING ADVANCED CRYPTOGRAPHIC ALGORITHMS

(75) Inventors: Robert R. Jueneman, Milpitas, CA (US); Duane J. Linsenbardt, San Jose, CA (US); John N. Young, San Jose, CA (US); William Reid Carlisle, St. Petersburg, FL (US)

(73) Assignee: Spyrus, Inc., San Jose, CA (US)

( * ) Notice: Subject to any disclaimer, the term of this patent is extended or adjusted under 35 U.S.C. 154(b) by 924 days.

(21) Appl. No.: 11/924,406

(22) Filed: Oct. 25, 2007

(65) Prior Publication Data

US 2008/0130895 A1 Jun. 5, 2008

Related U.S. Application Data

(60) Provisional application No. 60/862,945, filed on Oct. 25, 2006.

(51) Int. Cl.
*H04L 9/00* (2006.01)
*H04L 9/32* (2006.01)
*G06F 11/30* (2006.01)

(52) U.S. Cl. .......... 380/28; 380/277; 380/278; 380/279; 380/280; 713/187; 713/188; 713/189

(58) Field of Classification Search .................... 280/28; 380/28

See application file for complete search history.

(56) References Cited

U.S. PATENT DOCUMENTS

| | | | |
|---|---|---|---|
| 6,005,874 | A | 12/1999 | Sharpe |
| 6,341,164 | B1 | 1/2002 | Dilkie et al. |
| 6,687,822 | B1 | 2/2004 | Jakobsson |
| 7,110,548 | B1 | 9/2006 | Ougi et al. |
| 7,162,647 | B2 | 1/2007 | Osaki |
| 7,240,220 | B2 | 7/2007 | Osaki |
| 7,281,139 | B2 | 10/2007 | Stewart |
| 7,496,199 | B2 * | 2/2009 | Camus et al. ................. 380/247 |

(Continued)

FOREIGN PATENT DOCUMENTS

KR 10-2003-0043451 A 6/2003

(Continued)

OTHER PUBLICATIONS

International Preliminary Report on Patentability, PCT/IB/373, PCT/US07/082564, Apr. 28, 2009.

(Continued)

*Primary Examiner* — Longbit Chai
(74) *Attorney, Agent, or Firm* — Norman R. Van Treeck; Sheldon Mak & Anderson

(57) ABSTRACT

A method and system for deploying a suite of advanced cryptographic algorithms that includes: providing a legacy cryptographic interface that is associated with a legacy operating system and a legacy application, and supports a suite of legacy cryptographic algorithms; providing a suite of advanced cryptographic algorithms that includes one or more of an advanced asymmetric key algorithm, an advanced symmetric key algorithm, and/or an advanced hash function; providing an advanced cryptographic interface that is independent of the legacy operating system and the legacy application, backwards compatible with the legacy cryptographic interface, and capable of supporting the suite of advanced cryptographic algorithms; and transparently and automatically substituting the suite of advanced cryptographic algorithms for the legacy cryptographic algorithms through the invocation of the advanced cryptographic interface at the time of an initial performance of encrypting, hashing, digitally signing the hash of, decrypting, re-hashing, and/or validating the digital signature of an item.

37 Claims, 9 Drawing Sheets

U.S. PATENT DOCUMENTS

2002/0038420 A1    3/2002    Collins et al.
2006/0133616 A1    6/2006    Kim et al.
2006/0149962 A1    7/2006    Fountain et al.
2007/0033419 A1*    2/2007    Kocher et al. ................. 713/193

FOREIGN PATENT DOCUMENTS

KR    10-2004-0000925 A    1/2004

OTHER PUBLICATIONS

International Search Report, WO 2008/085579 A3, PCT/ISA/210, Dec. 4, 2008.

Johnston, Anna M., "Digitally Watermarking RSA Moduli," Sandia Nat. Lab., Albuquerque, NM 87185-0449, Feb. 19, 2001, pp. 1-9.

* cited by examiner

METHOD AND SYSTEM FOR DEPLOYING ADVANCED CRYPTOGRAPHIC ALGORITHMS

CROSS-REFERENCE TO RELATED APPLICATION

Priority is claimed under 35 U.S.C. §119(e) to U.S. Provisional Patent Application No. 60/862,945 filed on Oct. 25, 2006, entitled "Method and Apparatus for Deploying Advanced Cryptographic Algorithms in a Limited Change Scenario," by Robert R. Jueneman, John N. Young, Duane J. Linsenbardt, and William Reid Carlisle, which application is incorporated by reference herein.

FIELD OF THE INVENTION

The field of this invention is the deployment of advanced cryptographic algorithms within legacy applications. More specifically, the method of the present invention relates to the use of a transparent method and apparatus for substituting and using advanced cryptographic algorithms, method, and protocols in place of legacy algorithms ab initio, i.e., from the moment the application first requests the creation or use of the legacy algorithm, method, or protocol in order to, for example, secure e-mail and other documents as transparently as possible, i.e., without waiting for operating system and application developers to offer native support for those algorithms throughout their products.

BACKGROUND

Legacy cryptographic algorithms and protocols developed over 30 years ago, e.g., triple-DES, RSA, and SHA-1, are becoming obsolete and are at risk of being compromised or "broken" in the relatively near future. More advanced algorithms are available and have been adopted as a standard by the U.S. Government and other countries, including but not limited to the set of unclassified algorithms called "Suite B," consisting of Elliptic Curve Cryptography (ECC), the Advanced Encryption Standard (AES), and the new family of Secure Hash Algorithms generically referred to as "SHA-2." Those skilled in the art of cryptography will recognize that other cryptographic algorithms could be substituted for the Suite B algorithms with equal effect, potentially including but not limited to those classified algorithms and protocols that make up the "Suite A" algorithms used exclusively by the U.S. Government, as well as other proprietary and/or classified algorithms used elsewhere in the world.

However, directly incorporating these advanced algorithms within existing operating systems and/or cryptographic applications would require extensive rewrites at a significant cost and with a substantial delay in widespread availability to take advantage of them. In addition, the introduction of such advanced algorithms cannot be accomplished with the flick of a switch, but instead must be phased in over time. In general, this phased introduction will give rise to serious interoperability problems, with a portion of the community not being able to communicate with others until the conversion has been completed.

To broadly summarize the limits of existing technology which this invention mitigates, prior art has addressed the use of algorithm selection or negotiation between two communicating parties, e.g., a client and server or an originator and one or more recipients, during a session establishment "handshaking" operation. Other prior art has dealt with the use of replacement algorithms to decrypt and re-encrypt and/or re-hash and/or to apply a replacement or supplemental digital signature to the contents of already existing stored files or messages, in order to reduce the size of those files or messages as stored, or to enhance the security properties as time passes and algorithms become easier to break. Such approaches have not adequately addressed the introduction and support of new encryption/decryption and digital signature cryptographic algorithms that coexist with and interoperate in concert with older legacy algorithms at the time the encrypted and/or digitally signed data is first created.

Prior art has addressed situations for the conversion of a first encryption algorithm to a second encryption algorithm for encrypted communications where the identities of senders and receivers and their specific cryptographic algorithms are all known and are maintained within a centralized database. This database can be queried by a system manager, or manually, to permit identification of user-associated cryptographic algorithms, and the distribution of the shared preferred algorithm to one or both of the parties and its installation in the user's computer. In a typical operation described in prior inventions, the transmission side queries the user identification database and selects an encryption algorithm operated at a transmission side with an encryption algorithm operated at the reception side and transmits the encryption algorithm to the reception side. This encryption algorithm conversion method requires three-party communications and associated delays and service costs to substitute one set of cryptographic algorithms for another. This art does not address the coexistence of mixed digital signature and encryption algorithm environments such as in e-mail, messaging, and collaborative business transactions where the senders and receivers have not previously been known to each other nor agreed to maintain a shared user identification database, or where advanced knowledge of their cryptographic algorithms is not known.

Another existing method for the upgrading and conversion of cryptographic algorithms employs pure replacement methods to increase the encryption strength of previously generated encrypted data stored in a network storage system, by converting the data blocks of the storage system from a first set of cryptographic methods to a second set of stronger cryptographic methods. Such prior art is directed at increasing the security of long term stored data on network storage systems to make it less susceptible to security risks of intrusion by the progressive conversion of blocks of data. Such art does not address issues of providing user transparency for digital signature and encryption applications using both legacy and upgraded cryptographic methods in interactive communications among groups of senders and receivers.

Still other art addresses the upgrading of authentication methods by which users access protected services from a legacy server, by providing a proxy web-based second server to receive user authentication requests from a first legacy server, and forwarding those service requests and the user's credentials to a network-based authentication module or local user database to determine if the user's credentials qualify for access to protected pages on the legacy server. This allegedly simplifies development of more complex and stronger authentication methods by inserting a common protocol between the different clients and their authentication methods, and the proxy web server, which then communicates with the authentication service or user database. This form of art does not address interactive communications among impromptu groups of senders and receivers or user transparency of operations for digitally signed and/or encrypted messages using both legacy and upgraded cryptographic algorithms in open network environments.

In other existent methods for achieving cryptographic algorithm interoperability between senders and receivers, Secure Sockets Layer (SSL) and similar protocols permit the negotiation of the cryptographic algorithms and key lengths to be used, based on the capabilities of the client and the server, on a one-to-one basis, but this is limited to transmission security between the nodes for each single session, and not to the contents communicated through an end-to-end store-and-forward communication system. Secure/Multipurpose Internet Mail Extensions (S/MIME), (RFC 2633) provides a mechanism whereby the selection of the algorithms to be used can be performed on the basis of an S/MIME Capabilities attribute provided by the recipient in a previous message. Only recently (September 2007, in RFC 5008) have the S/MIME standards been extended to deal with the advanced "Suite B" cryptographic algorithms, and no method or means are described or specified, nor does prior art exist to support this technology on legacy applications or operating systems.

Other prior art for upgrading cryptographic algorithms is applied to secure communications systems whereby different cryptographic devices can be inserted back-to-back into each channel of a multi-line trunk to permit automated conversion from one subscriber's cryptographic method, e.g., a legacy method, to another stronger method for a second subscriber's method dictated by their terminal equipments and dialing code protocols. Such art does not apply to more general packet communications networking supported by the Internet and other network architectures, nor does it address interoperability with coexistent legacy and advanced digital signature algorithms.

Prior art also provides post facto solutions for direct substitution of one cryptographic encryption/decryption algorithm by another and re-encryption of the message data or header based on the contents of data in key usage fields provided by the accompanying sender's certificate, and dependent upon system wide standards and policies to enforce uniform substitution, as in the case of a mail server for a community of users. Such a solution does not provide for gradual adoption of improved encryption security methods through transparent interoperability among individuals or ad hoc groups of senders and recipients of both legacy and advanced encrypted communications through the use of dual key certificates whereby one of a set of simultaneously available encryption algorithms can be chosen for decryption based on the capabilities and standards supported by each individual recipient's computer. Prior art does not address methods and apparatus to enable transparent interoperability of digital signature applications using both legacy and improved cryptographic algorithms through means to automatically choose one of a number of simultaneously operable different signing algorithms for communications among communities of users each of whose computer facilities and software only support one of the sets of algorithms.

Overview of the ECC Adoption Problem

One of the primary impediments to the widespread adoption and use of Elliptic Curve Cryptography (ECC) is the lack of availability of ECC certificates, and in particular an ECC key that is embedded within a certificate that is signed using RSA, e.g., using an appropriate self-signed root key and certificate. Although it would be possible to set up a parallel hierarchy of RSA and ECC root certificates and cross-certify them, this additional complexity is in itself an impediment to timely adoption.

One preferred approach would be to use the Microsoft® Windows® Server CA or similar application to issue ECC certificates signed by an RSA key in a very straightforward manner. Unfortunately, it currently appears that this capability is probably not going to be available until the Windows Server (codenamed "Longhorn") becomes available, which may not be until 2008 or 2009, and is not likely to be widely deployed for several more years after that. At present, it does not seem likely that other ECC-enabled CA products and services will be available from other vendors or trusted third party providers any sooner than that.

In addition, even if some other Certification Authority were able to issue ECC certificates, it would still be a problem to get popular client operating systems and applications, e.g., Microsoft Windows XP and Office 2003, as well as other operating systems and applications such as Linux, Solaris, and others, to process those keys and certificates properly, at least until new operating systems and/or new service packs are released for existing systems to solve the problem. Because the support for the advanced algorithms may be considered an important differentiator and a motivating force to persuade users to upgrade to the latest version of the product, vendors may be reluctant to retrofit their older systems with the new technology.

As a result, an "outside the box" solution is necessary. Several options are possible:

1. It would be possible to encode an ECC certificate in a proprietary manner, by wrapping an ECC key and an elliptic curve digital signature algorithm (ECDSA) signature in what "appears" to be a properly encoded RSA signature field, but one that would be interpreted as the ECDSA signature by an updated middleware component. A "Critical" certificate extension could be included that would cause the certificate validation to fail, except on a system that supported the particular proprietary middleware, which would know how to process that certificate. However, many certificate-processing systems do not process the Critical bit properly, and that might lead to undesirable interoperability problems.

2. One preferred method would include an ECC public key within the "standard" X.509 certificate, as an ECDSA-signed certificate attribute extension, in addition to an RSA key that would be represented normally. With this scheme, the ECC key would be ignored by relying party software that didn't understand the attribute, while the ECC key would be validated only against an ECC chain of signatures, ignoring the RSA chain entirely. This would become a double-use certificate—most users would see and recognize only the RSA key, whereas those with the appropriate software would see the digitally signed ECC key within the certificate hierarchy. However, this approach cannot bind the rest of the content of the certificate including the user's Distinguished Name to the ECC key without a substantial reworking of the standard certificate processing mechanisms within the Certificate Authority program.

3. A certificate request could be generated containing both an RSA and an ECC public key, and sent to the Certificate Authority to be signed. After the signed certificate was generated, thereby proving that the identity of the user had been properly established, another process, e.g., the SPYRUS Signal Identity Manager Registration Authority, could operate as a "certificate creation utility" or a "shadow CA" to create a substitute ECC certificate, relying on the previously created RSA certificate as its authority to do so. The ECC certificate could make use of the same issuer name and serial number, so that revoking the RSA certificate (with a Certificate Revocation List (CRL) or Online Certificate Status protocol (OCSP)) would have the same effect as revoking the ECC certificate, and vice versa. Unfortunately, although this approach solves the problem of creating an ECC certificate, it does little to solve the certificate validation problem within legacy operating systems and applications.

It should, therefore, be appreciated that there is a need for a method of implementing ECC key establishment and digital signatures in accordance with the schemes defined in National Institute of Standards and Technology Special Publication 800-56A (NIST SP 800-56A) and Federal Information Processing Publication FIPS 186-2 in a Microsoft Windows or other general purpose operating system or application environment, despite the lack of support for ECC certificate path validation, as well as the absence of support for ECC primitives. In addition, there is a need for advanced symmetric key algorithms and hash functions, e.g., the Advanced Encryption Standard and the advanced family of Secure Hash Functions ("SHA-2"), that provide cryptographic strength equivalent to the strongest ECC keys. The present invention satisfies these need.

SUMMARY

Embodiments of the present invention meet this need by implementing protocols essentially "sub tabula," substituting advanced algorithms or protocols for the legacy encryption and digital signature protocols currently used at the time of the initial processing of the information, namely when applying encryption or a digit signature, or both. An exemplary method according to the invention is a method for deploying a suite of advanced cryptographic algorithms. The method includes providing a legacy cryptographic interface that is associated with a legacy operating system and a legacy application, and supports a suite of legacy cryptographic algorithms. Also, the method further includes providing a suite of advanced cryptographic algorithms that includes one or more processes that are an advanced asymmetric key algorithm, an advanced symmetric key algorithm, and/or an advanced hash function. In addition, the method further includes providing an advanced cryptographic interface that is the following: independent of the legacy operating system and the legacy application, backwards compatible with the legacy cryptographic interface, and capable of supporting the suite of advanced cryptographic algorithms. In addition, the method further includes transparently and automatically substituting the suite of advanced cryptographic algorithms for the legacy cryptographic algorithms through the invocation of the advanced cryptographic interface at the time of an initial performance of encrypting an item, hashing the item, digitally signing the hash of the item, decrypting the item, re-hashing the item, and/or validating the digital signature of the item, where the item is a message, a file, and/or text.

In other, more detailed features of the invention, the one or more of the legacy cryptographic algorithms is an asymmetric key algorithm, a key transport algorithm, a key agreement algorithm, Rivest-Shamir-Adleman (RSA), the Key Exchange Algorithm (KEA), Diffie-Hellman, El Gamal, Menezes-Qu-Vanstone (MQV), an asymmetric public key digital signature algorithm, RSA, Digital Signature Algorithm (DSA), the Russian GOST signature algorithm, the Korean Certificate-based Digital Signature Algorithm (KCDSA), a symmetric key algorithm, Date Encryption Standard (DES), triple-DES, SKIPJACK, CAST, TWOFISH, BLOWFISH, IDEA, RC4, Commercial Data Masking Facility (CDMF), a hash function, Message Authentication Code (MAC), MD-2, MD-4, MD-5, RIPEMD, SHA-1, extended and keyed hash function constructions, HMAC, and/or HAIFA. Also, the legacy cryptographic interface can be the Microsoft Cryptographic Application Programming Interface (CAPI) Cryptographic Service Provider, the Public Key Cryptographic Standard #11 (PKCS#11), the FORTEZZA API and command set, RSA BSAFE, IBM Common Cryptographic Architecture (CCA), and/or Novell International Cryptographic Infrastructure (NICI). In addition, the one or more of the suite of advanced cryptographic algorithms can be an asymmetric key algorithm, an asymmetric key transport algorithm, a key agreement algorithm, an Elliptic Curve Cryptography algorithm over GF(p), GF($2^n$), and Koblitz fields, Elliptic Curve Diffie-Hellman (EC-DH), Elliptic Curve Menezes-Qu-Vanstone (ECMQV), Elliptic Curve Integrated Encryption Scheme (ECIES), Provably Secure Encryption Curve Scheme (PSEC), Elliptic Curve Station to Station Protocol, an asymmetric public key digital signature algorithm, Elliptic Curve Digital Signature Algorithm (ECDSA), Elliptic Curve Korean Certificate-based Digital Signature Algorithm (EC-KCDSA), Elliptic-Curve Pintsov-Vanstone Signatures (ECPVS), a symmetric key algorithm, Advanced Encryption Standard (AES), a hash function, SHA-224/256/384/512, and/or extended and keyed variations of SHA-224/256/384/512.

In other, more detailed features of the invention, at least one of the suite of legacy cryptographic algorithms has associated with it a legacy asymmetric public/private key pair that includes a legacy private key. The method further includes providing a hash function, and using the legacy private key to digitally sign the hash function.

In other, more detailed features of the invention, at least one of the suite of legacy cryptographic algorithms has associated with it a legacy asymmetric public/private key pair that includes a legacy public key and a legacy private key. The method further includes providing a legacy symmetric key algorithm that has associated with it a legacy symmetric key, and performing one or more of the following actions: using the legacy public key to directly encrypt the legacy symmetric key; providing a legacy private key that is associated with a first party (the originator) at the time of encryption, providing a legacy public key that is associated with a second party (a recipient), and using the legacy public key of the recipient together with the legacy private key of the originator at the time of encryption to securely negotiate or agree upon a key to be shared between the originator and the recipient, either directly or through the use of Derived Keying material and a Key Derivation Function; using the legacy private key to directly decrypt the legacy symmetric key; and providing a legacy public key that is associated with a first party (the originator) at the time of decryption, providing a legacy private key that is associated with a second party (a recipient), and using the legacy private key of the recipient together with the legacy public key of the originator at the time of decryption to securely negotiate or agree upon a key to be shared between the originator and the recipient, either directly or through the use of Derived Keying material and a Key Derivation Function.

In other, more detailed features of the invention, the one or more processes includes an advanced asymmetric key algorithm and an advanced hash function, and the method further includes using the advanced asymmetric key algorithm to generate an advanced public key and an advanced private key, applying the advanced hash function to a message, a file, and/or text to produce a hash function result, and computing a digital signature using the advanced asymmetric key algorithm and the advanced private key together with the hash function result, where the digital signature can be validated by use of the corresponding advanced public key.

In other, more detailed features of the invention, the one or more processes includes an advanced asymmetric key algorithm that has associated with it an advanced public key and an advanced private key, and the method further includes providing an advanced asymmetric key algorithm, and using the advanced public key that is associated with a second party (a recipient) together with the advanced private key that is associated with a first party (the originator) at the time of encryption, and correspondingly the advanced private key of the recipient together with the advanced public key of the originator at the time of decryption, to securely negotiate or agree upon an advanced symmetric key to be shared between the originator and the recipient, either directly or through the use of Derived Keying material and a Key Derivation Function.

In other, more detailed features of the invention, the one or more processes includes an advanced asymmetric key algorithm, and the method further includes using the advanced asymmetric key algorithm to generate an advanced public key, where the advanced public key is embedded in a public key certificate, and signaling that the advanced public key is embedded in the public key certificate using another item that is included in the public key certificate, where the another item is an indicator, an attribute, a flag, and/or a hash function.

In other, more detailed features of the invention, the one or more processes includes an advanced asymmetric key algorithm, and the method further includes using one of the suite of legacy cryptographic algorithms to generate a legacy public/private key pair that includes a legacy public key, using the advanced asymmetric key algorithm to generate an advanced public/private key pair that includes an advanced public key, providing a watermarking technique, and embedding the advanced public key within the legacy public key using the watermarking technique.

In other, more detailed features of the invention, the one or more processes includes an advanced asymmetric key algorithm, and the method further includes using one of the suite of legacy cryptographic algorithms to generate a legacy public/private key pair that includes a legacy public key that is associated with a Certification Authority, and using the advanced asymmetric key algorithm to generate an advanced public/private key pair that includes an advanced public key, where the advanced public/private key pair is to be used in association with, or substituted for, the legacy public/private key pair. The method also includes conveying both the legacy public key and the advanced public key to a recipient where the advanced public key is conveyed to the recipient in another item that is a certificate attribute extension containing the advanced public key and included within a standard public key certificate containing the legacy public key, and/or a separate Attribute Certificate that is linked to the standard public key certificate, and an encoded field. If the another item is a certificate attribute extension, the standard public key certificate is an X.509 certificate and/or an XML-encoded certificate, In addition, the method also includes signing either the standard public key certificate or the Attribute Certificate using the legacy public key associated with the Certification Authority so as to satisfy certificate path validation and revocation checking constraints and practices of the Certification Authority.

In other, more detailed features of the invention, the one or more processes includes an advanced asymmetric key algorithm, using the advanced asymmetric key algorithm results in an advanced public key having a length and an encrypted or digitally signed result, and the advanced public key, in comparison to a public key that result from one of the suite of legacy cryptographic algorithms, has a shorter key length and/or a shorter encrypted or digitally signed result for equivalent or higher cryptographic strength or performance.

In other, more detailed features of the invention, the method further includes providing a random or pseudo-random number generator, using the random or pseudo-random number generator to generate a legacy symmetric key, and forming an advanced symmetric key by truncating the legacy symmetric key and/or hashing the legacy symmetric key using a hash function resulting in a shorter key length. Also, the method can further include using one of the suite of legacy cryptographic algorithms to generate a legacy public/private key pair that includes a legacy public key, using the advanced asymmetric key algorithm to generate an advanced public/private key pair that includes an advanced public key, and associating the legacy public key with the advanced public key.

In other, more detailed features of the invention, the legacy cryptographic interface includes a legacy protocol that is an encryption protocol, a key transport protocol, a key exchange protocol, and/or a key agreement protocol. The legacy protocol requires one or more cryptographic parameters that are an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and/or random padding fields. The advanced cryptographic interface includes and supports an advanced protocol that is an encryption protocol, a key transport protocol, a key exchange protocol, and/or a key agreement protocol. The advanced protocol requires one or more cryptographic parameters that are an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and/or random padding fields. The advanced cryptographic interface and at least one of the suite of advanced cryptographic algorithms respectively can be substituted for the legacy cryptographic interface and at least one of the suite of legacy cryptographic algorithms in a transparent manner.

In other, more detailed features of the invention, the method further includes computing a legacy digital signature using a first protocol that requires a variable that is item that is to be signed, a hash of the item that is to be signed, a secondary hash of the item that is to be signed, a date of the digital signature, a time of the digital signature, a location of the digital signature, a message counter, and/or a unique value that is associated with the item that is to be signed. The advanced cryptographic interface includes and supports a second protocol that is Elliptic Curve Diffie-Hellman (ECDH), Elliptic Curve Menezes-Qu-Vanstone (ECMQV), Elliptic Curve Integrated Encryption Scheme (ECIES), Provably Secure Encryption Curve Scheme (PSEC), and/or Elliptic Curve Station to Station Protocol; and advanced digital signature components that are conventional (r,s) outputs generated by an ECDSA signature scheme where r is effectively an ephemeral key and s is the signature result computed by hashing one or more variables that are a hash of the item that is to be signed, a secondary hash of the item that is to be signed, a date of the digital signature, a time of the digital signature, a location of the digital signature, a message counter, a unique value that is associated with the item that is to be signed, a random per-message salt variable used as part of a hash calculation, a flag, a length count, an indicator, a type field, and/or a random padding field. The advanced cryptographic interface, one of the advanced digital signature cryptographic algorithms, and one or more of the advanced digital signature components, respectively can be substituted for the legacy cryptographic interface and at least one of the suite of legacy cryptographic algorithms in a transparent manner.

An exemplary embodiment of the invention is a system including a security processor that supports a suite of advanced cryptographic algorithms and is configured to provide a legacy cryptographic interface that is associated with a legacy operating system and a legacy application, and supports a suite of legacy cryptographic algorithms. Also, the security processor is configured to provide a suite of advanced cryptographic algorithms that includes one or more processes that are an advanced asymmetric key algorithm, an advanced symmetric key algorithm, and/or an advanced hash function. In addition, the security processor is configured to provide an advanced cryptographic interface that is independent of the legacy operating system and the legacy application, backwards compatible with the legacy cryptographic interface, and capable of supporting the suite of advanced cryptographic algorithms. Furthermore, the security processor is configured to transparently and automatically substitute the suite of advanced cryptographic algorithms for the legacy cryptographic algorithms through the invocation of the advanced cryptographic interface at the time of an initial performance of an operation that is encrypting an item, hashing the item, digitally signing the hash of the item, decrypting the item, re-hashing the item, and/or validating the digital signature of the item, where the item is a message, a file, and text.

In other, more detailed features of the invention, the security processor including the suite of advanced cryptographic algorithms and their associated private keys, other Critical Security Parameters, and any derived keying material are implemented in and confined to a hardware device that is a separate removable hardware device and/or a Trusted Platform Module that cannot be easily disabled or removed from a host device that is a computer, a computing device, and/or a communication device. Critical security parameters can include security-related information (e.g., secret and private cryptographic keys, and authentication data such as passwords and PINs) whose disclosure or modification can compromise the security of a cryptographic module or the security of the information protected by the module.

In other, more detailed features of the invention, the security processor is implemented in a hybrid fashion where the security processor and the suite of advanced cryptographic algorithms and their associated private keys, other Critical Security Parameters, and any derived keying material are implemented in and confined to a separate removable hardware device; the security processor and the suite of advanced cryptographic algorithms and their associated private keys, other Critical Security Parameters, and any derived keying material are implemented in a Trusted Platform Module that cannot be easily disabled or removed from a host device that is a computer, a host computing device, and a communication device; and/or the advanced hashing function, the advanced symmetric key algorithm, keys, and encryption operations, and the digital signature verification functions can be performed in or on a module that is a computer, a host computing device, and/or a communication device, and/or one or more software modules, making use of a suitable communications interface between the host device and the one or more software modules.

In other, more detailed features of the invention, the security processor is implemented in software, and all of the advanced interfaces, cryptographic algorithms, keys, and other variables are implemented in one or more software modules.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings, where:

DETAILED DESCRIPTION

Figure 1:
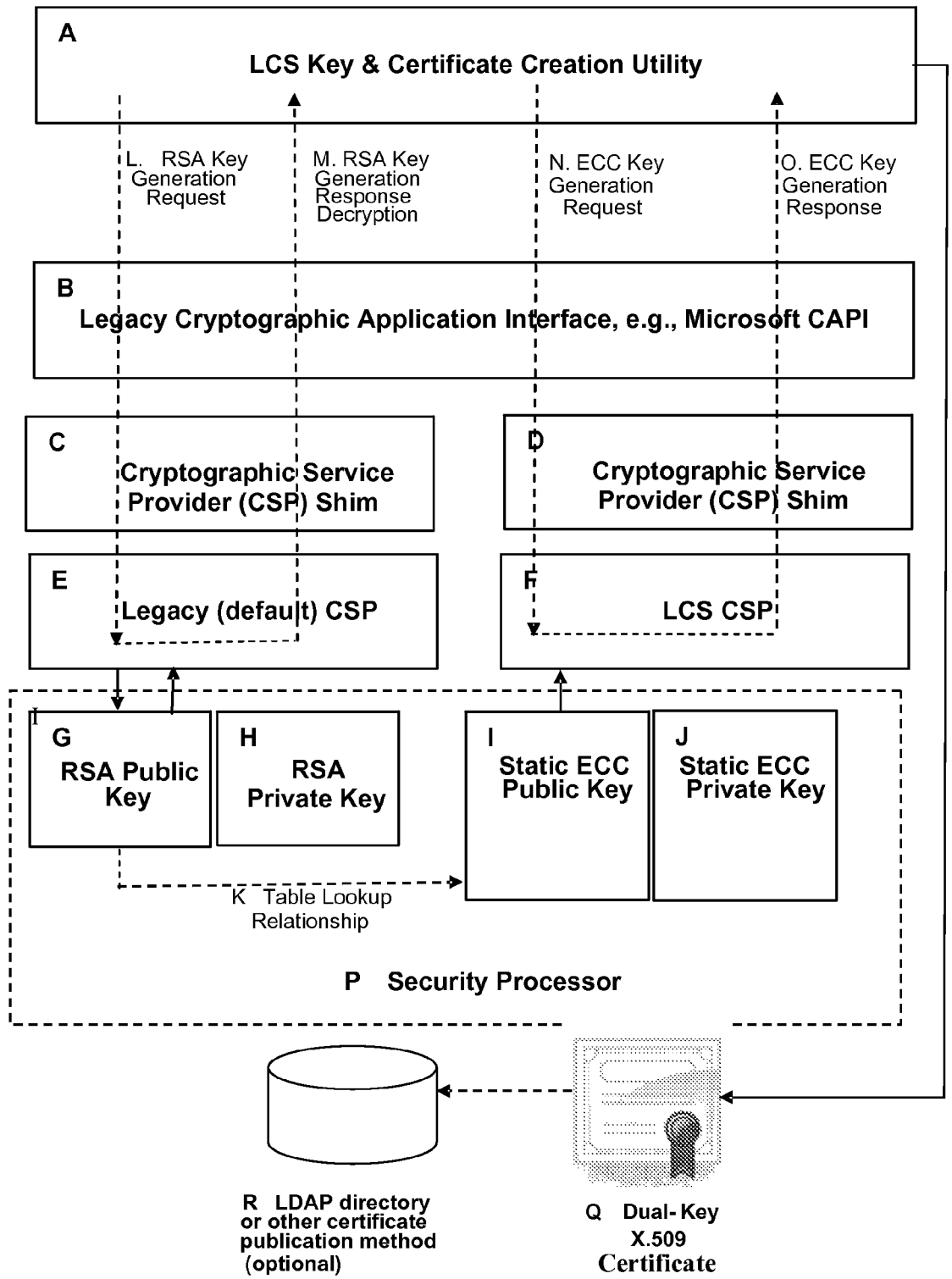
FIG. 1 is a block diagram that illustrates a Limited Change Scenario (LCS) Dual-Key certificate creation according to a preferred embodiment.

The invention involves the deployment of advanced cryptographic algorithms within legacy applications through a Limited Change Scenario (LCS), whereby advanced cryptographic algorithms and security tokens can be used to secure e-mail and other documents as transparently as possible without waiting for operating system and application developers to offer native support for those algorithms throughout their products.

The invention deals with the transparent replacement/substitution of older public key transport (encryption) algorithms, e.g., Rivest-Shamir-Adleman (RSA), Key Exchange Algorithm (KEA), Diffie-Hellman, El Gamal, or Menezes-Qu-Vanstone (MQV), the Russian GOST, the Korean Certificate-based Digital Signature Algorithm (KCDSA), Digital Signature Algorithm (DSA), or other publick key algorithm, by or with the newer and stronger Elliptic Curve Cryptography (ECC) algorithms, e.g., EC Diffie-Hellman (EC-DH), ECMQV, or Elliptic Curve Integrated Encryption Scheme (ECIES); and the older public key digital signature algorithms, e.g., RSA or Digital Signature Algorithm (DSA), by or with the corresponding ECC signature algorithms, e.g., the Elliptic Curve Digital Signature Algorithm (ECDSA) or the elliptic curve variant of the Korean Certificate-based Digital Signature Algorithm (EC-KCDSA). Likewise, the modern Advanced Encryption Standard (AES), using various key lengths can be substituted for the older symmetric key encryption algorithms, e.g., Data Encryption Standard (DES), SKIPJACK, triple-DES, CAST, GOST, IDEA, RC4, Commercial Data Masking Facility (CDMF), a TWOFISH algorithm, a BLOWFISH algorithm, or other symmetric key algorithm. Finally, the more modern, but longer length family of "SHA-2" algorithms, viz. SHA-224/256/384/512 can be substituted for the older "legacy" cryptographic hash algorithms, e.g., Message Authentication Code (MAC), MD-1, MD-4, MD-5, SHA-1, RIPEMD, extended and keyed hash function constructions, HAIFA, or HMAC. Other exemplary advanced cryptographic algorithms include an asymmetric key transport algorithm, a key agreement algorithm, an Elliptic Curve Cryptography algorithm over GF(p), GF($2^n$), and Koblitz fields, Provably Secure Encryption Curve Scheme (PSEC), Elliptic Curve Station to Station Protocol, an asymmetric key digital signature algorithm, Elliptic Curve Digital Signature Algorithm (ECDSA), Elliptic Curve Korean Certificate-based Digital Signature algorithm (EC-KCDSA), Elliptic-Curve Pintsov-Vantsone Signatures (ECPVS), and a symmetric key algorithm.

The invention describes various methods that can be used to incorporate such replacement algorithms within certificate structures such as X.509, and within store-and-forward electronic mail applications such as the Secure/Multipurpose Internet Mail Extensions (S/MIME), among other possible applications.

The present invention allows legacy applications and operating systems to remain untouched, while substituting an improved cryptographic interface in the middleware, with or without the use of a hardware security processor. By taking advantage of the generally smaller key sizes used by the advanced algorithms, notably including but not limited to the ECC algorithms, it is possible to embed the results of using the newer algorithms in the applications and programming structures employed by the legacy algorithms, so that applications will operate transparently and yet provide significantly greater security.

For the purpose of teaching the basic principles, the key establishment and digital signature protocols used in this description will refer to the steps necessary to exchange an encrypted store-and-forward message using the S/MIME secure electronic mail protocol. Those with ordinary skill in the art will recognize that the same principle can be adopted for use within many other kinds of protocols.

The process begins with the initial generation of an appropriate ECC key or set of keys. Because the legacy application may know nothing at all about ECC keys, and for the sake of simplicity, a dedicated Limited Change Scenario (LCS) key and certificate generation application may be used for this purpose, such as the SPYRUS "MySafeID" key and certificate generation program.

In preferred embodiments, a dedicated "LCS" key and certificate generation program will be used to generate an RSA or other legacy key type key pair consisting of a private key and a corresponding public key per pair together with one or more ECC key pairs. These key pairs may be generated by a security processor implemented in software, or by a suitable cryptographic hardware module, such as the SPYRUS Rosetta Series II, LYNKS Series II, or Hydra Privacy Card® (Hydra PC™) Series II.

In current practice, it is not uncommon to use a single RSA key for both key transport and digital signature purposes and perhaps for other purposes as well. The newer standards and recommendations deprecate such practices, even though they function correctly cryptographically. Instead, the use of separate keys for separate purposes is encouraged. For this reason, preferred embodiments can return as many as three ECC keys together with single, multiple-use RSA key, to be incorporated in a certificate. These three keys may be as follows: (1) an ECDSA key, for ECC digital signatures; (2) an EC-Diffie-Hellman or ECMQV key used for the originator's static key agreement key if required for a particular protocol, and (3) an EC-Diffie-Hellman or ECMQV static key to be used as a recipient's static key agreement key, e.g., for use by the originator to facilitate reading his or her own messages, and to facilitate a respondent's reply message.

In preferred embodiments, the RSA key pair that is generated will be fully functional, albeit not as strong as may be desired, and the RSA public key will be included in an X.509 certificate in the standard way. It can be used for key transport (key encryption) or digital signature purposes, or both, for S/MIME interoperability with other users who do not have the LCS capability, as well as for other conventional legacy applications, including but not limited to smart card logon (client authentication) and Secure Sockets Layer (SSL) or Transport Layer Security (TLS) mutual authentication.

In addition to the RSA public key, in the preferred embodiments, the certificate will also contain one or more ECC public keys, encoded in the certificate as a new X.509 certificate attribute extension, called the ECCKeyAttribute. This attribute will contain the ECC public key and other necessary information (including the field type, key length, and encoding conventions used), providing at least two public keys within one certificate—the RSA public key and the stronger ECC public key.

Because the certificate will be signed with the RSA algorithm, all of the normal certificate path validation mechanisms will apply, and the extended certificate can be processed through the normal certificate path validation mechanism without difficulty. (The X.509 standard requires that certificate extensions that are not understood by an application be ignored for the sake of interoperability and extensibility, unless an extension is marked as 'Critical.')

When the dual-key LCS certificate is processed by an application that supports the LCS feature, the user's RSA public key will be ignored, and the stronger ECC key extracted and used in its place for any key transport or digital signature purposes. However, the binding between the user's Distinguished Name and the rest of the information in the certificate will continue to be validated through the normal certificate path validation mechanism, including verifying the Certification Authority's signature on the certificate, and verifying the chain of RSA signatures back to the trusted root. Certificate revocation status will be checked using the standard Certificate Revocation List (CRL) or Online Certificate Status Protocol (OCSP) mechanisms.

In the case of an S/MIME message that is encrypted with RSA and triple-DES, the typical process involves the creation of a randomly generated triple-DES Message Encryption Key (MEK). The message is encrypted using the MEK, and then the MEK is encrypted using the RSA public key of each recipient in turn and finally packaged in the required S/MIME format. This operation cannot be mirrored directly in the case of the ECC protocols, because the ECC protocols normally require the use of one or two key pairs per correspondent, consisting of one or two keys associated with the originator, and one or two keys associated with each of the various recipients.

In preferred embodiments, the ECC One-Pass Diffie-Hellman key establishment protocol is implemented instead of the RSA key exchange protocol. This requires that the originator use an ephemeral key pair plus the static public key of the designated recipient. The recipient's static public ECC key would be extracted from the (adapted) LCS certificate, and the originator's ephemeral key pair would be generated on the fly, as required. It may be useful to note that the same ephemeral key pair can be used to initiate a key establishment protocol with multiple recipients at essentially the same time, using the (different) static public key for each recipient in turn.

The shared secret, Z, is then computed by the originator by multiplying the originator's private ephemeral key times the recipient's static public key, in accordance with the well-known EC Diffie-Hellman key agreement scheme. The recipient has to receive the originator's public ephemeral key and the MEK, encrypted in the Transport Encryption Key (TEK) that is derived from the EC Diffie-Hellman shared secret. Although there is only one field, i.e., the one that would normally contain the RSA-wrapped TEK, point compression can be used to represent the x-coordinate of the originator's P-384 public key in only 384 plus 8 bits, or 392 bits total. If, as is suggested below, an unusual key length such as RSA-768 were used to signal the presence of a substitute ECC key instead of RSA, this would allow the EC Diffie-Hellman public key to easily fit within the RSA-wrapped TEK field with 376 bits left over (768−392=376 bits). For example, an AES-256 TEK key would fit with 120 bits to spare.

FIG. 1: LCS Dual-Key Certificate Creation

The LCS Key and Certificate Creation Utility (1.A) is used to create a RSA key pair, by means of the key generation and response protocol (1.L), (1.M), followed by one or more ECC key pairs (1.N), (1.O). The LCS Key and Certificate Creation Utility calls the Legacy Cryptographic Application Interface (1.B), e.g., the Microsoft CAPI interface, which normally calls the Cryptographic Service Provider (1.E). In preferred LCS embodiments, a CSP Shim (1.C and 1.D) is interposed between the Cryptographic Application Interface (1.B) and the Cryptographic Service Provider (1.E).

In the case of the RSA key generation operation, the shim layer (1.C) is essentially transparent, and merely passes on the RSA key generation request to the legacy or default CSP (1.E), which in turn may interface to a dedicated hardware cryptographic token such as the SPYRUS Rosetta Series II smart card or USB token (1.P). Alternately, it may implement the cryptographic services itself, or call another software provider to generate the key and later perform the necessary cryptographic functions.

After the RSA key pair has been generated, the RSA private key is held in protected storage, while the public key is transported back up the stack to the LCS Key Generation and Certificate Creation Utility (1.A).

The LCS Key Generation and Certificate Creation Utility (1.A) then requests an ECC key pair generation (1.N and 1.O), through the Legacy CAPI (1.B) as before, but in this case the CSP Shim (1.D) knows to use the special LCS CSP (1.F) to generate a static ECC key pair (1.I and 1.J).

In addition to generating and returning the ECC public key, the LCS CSP (1.F), in conjunction with the cryptographic token or software implementation (1.P), causes a linkage or table lookup mechanism or relationship to be established (1.K) between the RSA public key and the ECC public key to be used for a specific purpose (key agreement or digital signature).

Once the RSA public key plus one or more ECC public keys have been generated and returned, the LCS Key and Certificate Creation Utility (1.A) causes an X.509 certificate with the proper contents to be created (1.Q), with the ECC key or keys included within the certificate as unique certificate extension(s). Finally, the certificate may be written to a suitable certificate publishing mechanism such as a Lightweight Directory Access Protocol (LDAP) directory or other repository (1.R), from whence it can be distributed in the customary manner.

Figure 2:
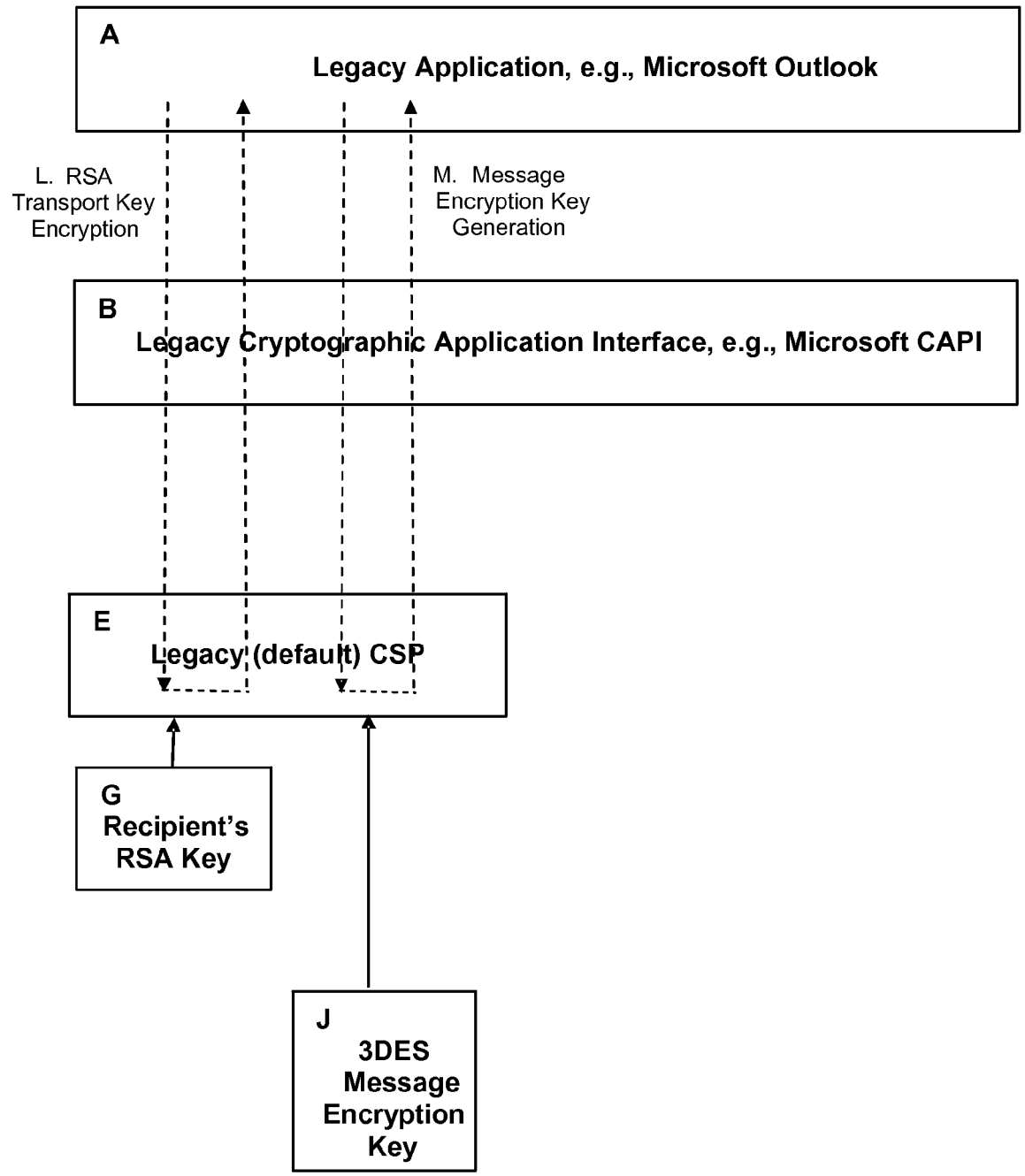
FIG. 2 is a block diagram that illustrates an application layer stack and encryption key transport for legacy application support according to a preferred embodiment.

FIG. 2: Application Layer Stack, Encryption Key Transport for Legacy Application Support Only FIG. 2 depicts the process of encrypting a legacy Message Encryption Key, e.g., a triple-DES key, using a legacy CSP and the recipient's RSA public key.

The legacy application, e.g., Microsoft's Outlook e-mail program, (2.A) initiates a process (2.M) by calling the legacy Cryptographic Application Interface (2.B) to cause the CSP (2.E) to create a random triple-DES Message Encryption Key (2.J) and typically an Initialization Vector (IV) as well.

Once the Message Encryption Key has been generated, it is wrapped (encrypted) using the recipient's RSA public key, as shown in (2.L), and the wrapped key is included in the S/MIME message. The process of encrypting the message itself with the Message Encryption Key and IV is not illustrated, but passes through the same series of calls. In most cases, the legacy CSP generates the Message Encryption Key in software and also encrypts the message in software, even if a hardware module was used to store the RSA key.

Figure 3:
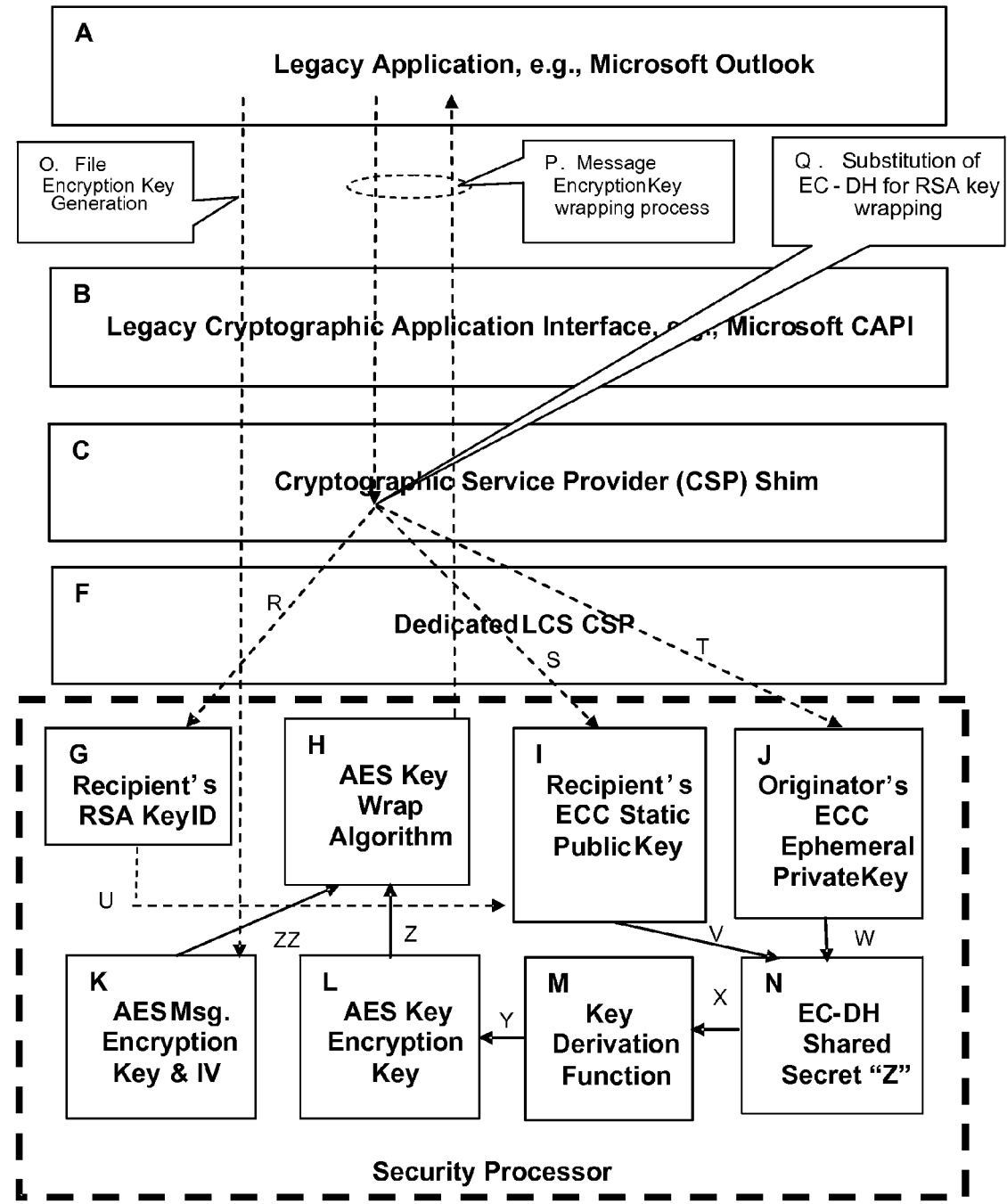
FIG. 3 is a block diagram that illustrates an application layer stack and encryption key transport for the modified LCS environment according to a preferred embodiment.

FIG. 3: Application Layer Stack, Encryption Key Transport for the Modified LCS Environment FIG. 3 depicts the process of generating and encrypting a Message Encryption Key, e.g., an AES-256 key, using a legacy application, legacy Cryptographic API, an LCS Cryptographic Service Provider shim layer, and a dedicated LCS Cryptographic Service Provider, plus a hardware module or corresponding software application.

The legacy application, e.g., Microsoft's Outlook e-mail program (3.A) initiates a Message Encryption Key generation process (3.O) by calling the legacy Cryptographic Application Interface (4.B) to (ostensibly) cause the CSP to create a random triple-DES Message Encryption Key. However, the CSP shim (3.C) substitutes a request to generate an AES-256 key instead (3.K), and causes that key to be stored in a key slot in the security processor hardware module or corresponding software application.

The next step would normally be to wrap that Message Encryption Key in the RSA public key of the designated recipient. (This process may be repeated multiple times in the case of multiple recipients for a given message.)

However, the LCS Cryptographic Service Provider Shim function replaces this functionality with the Elliptic Curve Diffie-Hellman (or other suitable protocol).

Working together, the Shim (3.C), the LCS CSP (3.F) and the hardware or software cryptographic security processor implement this function in several sub-steps. As illustrated by flow (3.R), the Shim and CSP obtain the key ID of the nominal RSA key to be used, and then parses the LCS dual-key X.509 certificate to locate the corresponding recipient's static ECC public key, and passes that to the security processor ((3,I) via flow (3.S).

The shim then calls the LCS CSP to generate an ephemeral ECC key pair (public and private) of the appropriate key length (3,J) on behalf of the originator. Once the recipient's static ECC public key (3,I) and the originator's private key (3,J) are available, the EC Diffie-Hellman key agreement protocol or similar protocol is executed, resulting in the shard secret conventionally called "Z" (3,N). As described in NIST SP 800-56A, this process involves multiplication of the recipient's public key times the originator's private key within the ECC field of choice.

The shared secret, Z, from the EC-Diffie-Hellman operation is then used as the primary input to a Key Derivation Function (KDF) (3,M), whose various other inputs are described in SP 800-56A. In preferred embodiments, those other inputs will be extracted from the recipient's certificate at the same time the public keys are extracted, and passed to the security processor in the same manner the public keys are.

The output of the Key Derivation Function (3,M) is used to generate an AES Key Encryption Key (3,L) of the desired length, e.g., 256 bits for AES-256.

Once the Message Encryption Key (MEK) and Initialization Vector (IV) have been generated, they are wrapped (encrypted) using the Key Encryption Key and the standard AES key Wrap algorithm (3,H). The final result is then returned to the legacy application (3,A), via the return flow (3,P).

The process of encrypting the message itself is not illustrated, but passes through a similar series of calls. In most cases, the CSP generates the Message Encryption Key in software and also encrypts the message in software, even if a hardware security processor was used to store the RSA and ECC keys.

Figure 4:
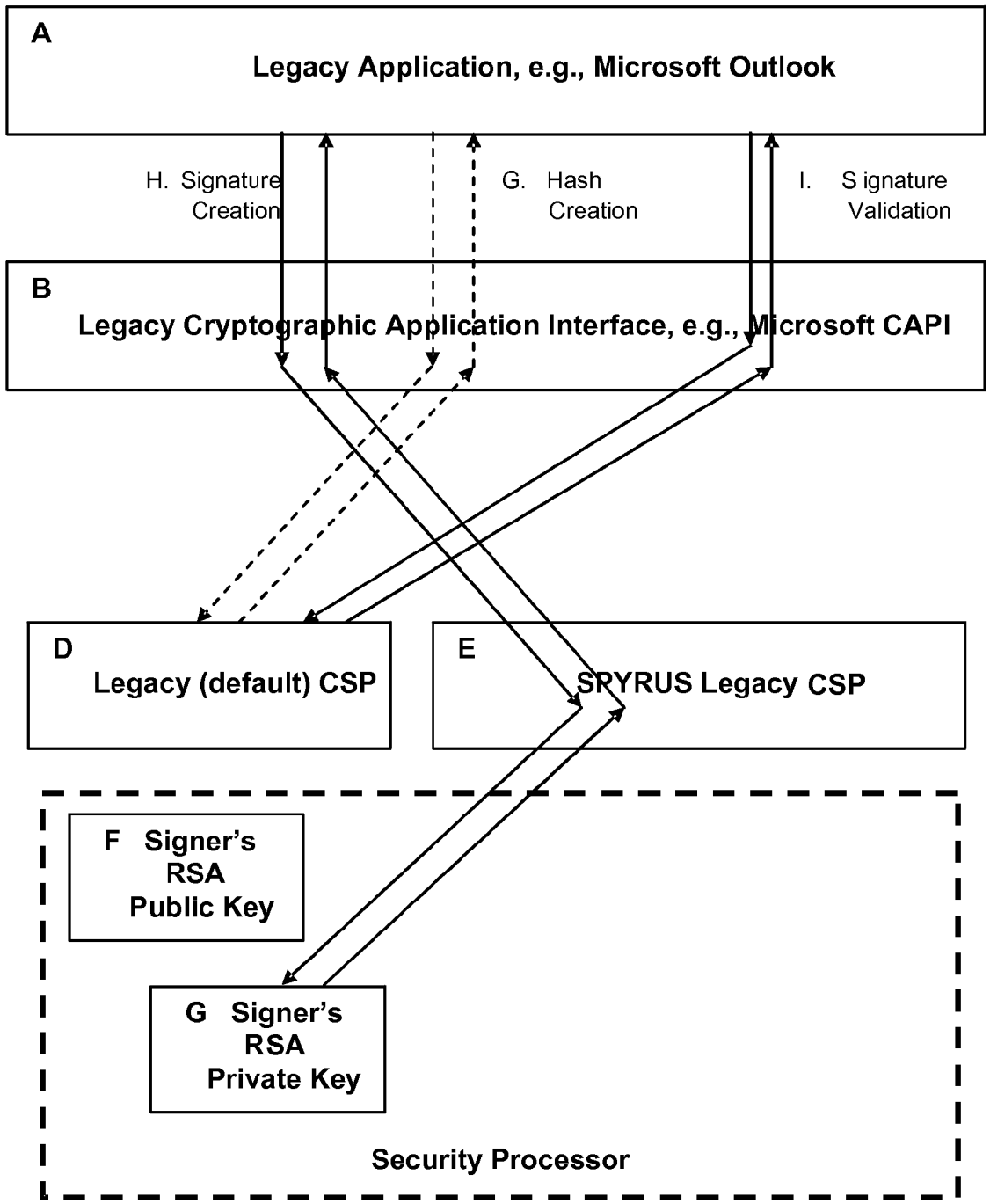
FIG. 4 is block diagram that illustrates an architectural layer stack and legacy signature creation and validation without an LCS configuration according to a preferred embodiment.

FIG. 4: Architectural Layer Stack: Legacy Signature Creation and Validation without LCS Configuration FIG. 4 illustrates the conventional, legacy approach to generating and validating a digital signature, i.e., in an environment without any of the LCS capabilities having been installed, when the RSA private key is generated and used within the confines of a hardware cryptographic security processor, but the hash value is calculated and the public key validation is performed in software.

The legacy application, e.g., Microsoft Outlook (4,A), begins the process by calling the legacy Cryptographic API (4,B) to create a hash value (4,G). The legacy Cryptographic API then calls the legacy (default) CSP (4,D) to calculate the hash value over the message that is to be signed. That process is carried out in software, within the CSP.

Once the hash value has been calculated and returned to the legacy application, the legacy application causes the RSA signature (4,H) to be calculated for the particular hash value. Because the RSA private key is assumed to be stored on a hardware module in this case, e.g., a SPYRUS Rosetta smart card or USB token, the corresponding legacy hardware CSP, e.g., the SPYRUS RSA CSP (4,E), is called to carry out this function by interacting with the cryptographic module and the RSA private key (4,G). The digitally signed hash is then returned back up the stack to the legacy application, where it is combined with the message and stored or transmitted.

When the legacy application receives a digitally signed message, the same hash generation process (4,G) is performed over the message or text, just as it was during a signature generation process. However, rather than recreating the signature and comparing them (since the recipient in general does not process the private key), the RSA signature verification algorithm is called (4,I) to regenerate the signature value using the hash value and the RSA public key (which may have been included in the message text, or extracted from the signer's certificate). That regenerated value is then returned to the legacy application, where it is compared for equality with the digital signature as received.

Figure 5:
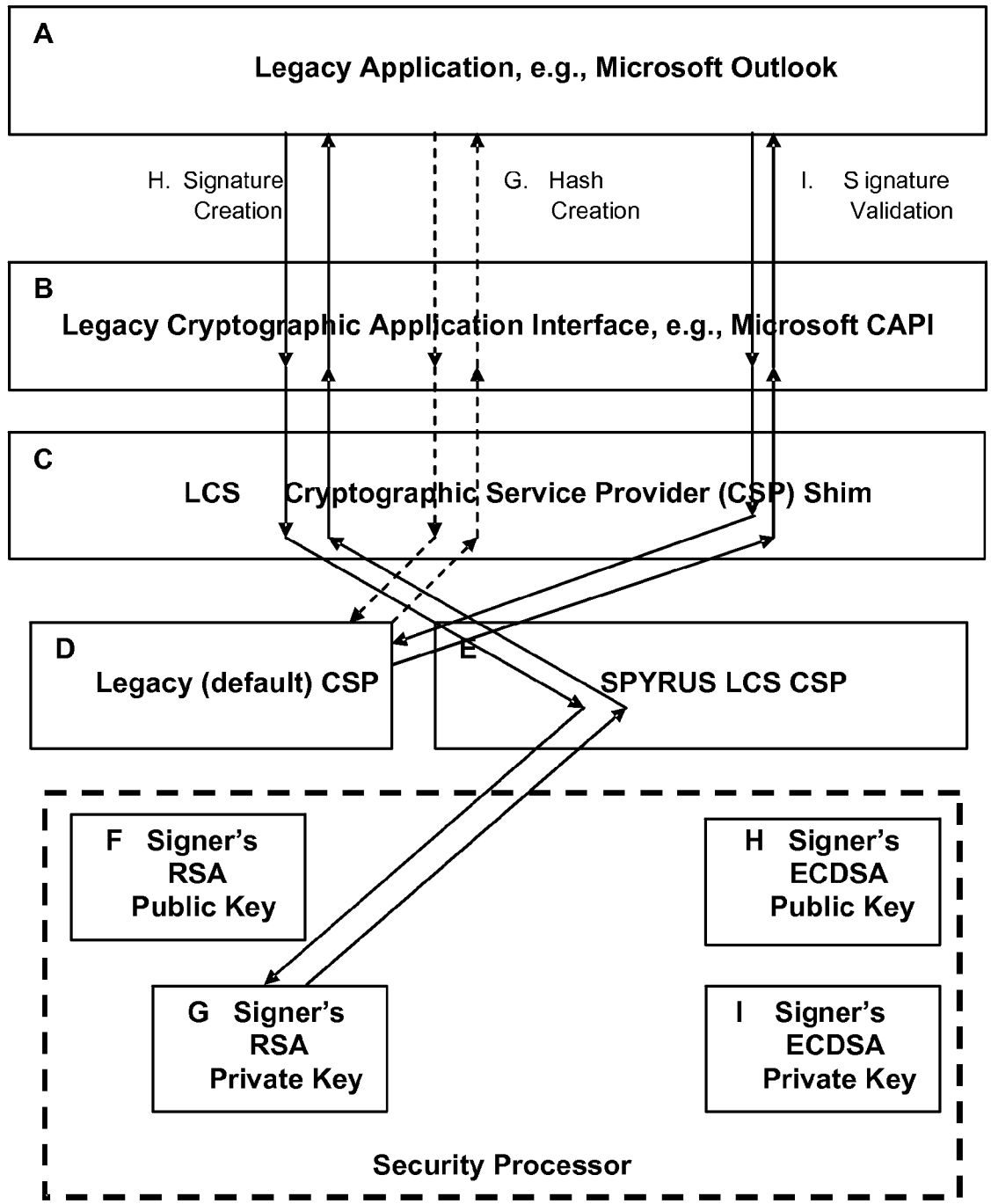
FIG. 5 is a block diagram that illustrates an architectural layer stack and signature creation and validation in an LCS configuration according to a preferred embodiment.

FIG. 5: Architectural Layer Stack: Legacy Signature Creation and Validation in LCS Configuration FIG. 5, and the processes it describes, is nearly identical to FIG. 4 except for the introduction of the LCS Cryptographic Service Provider Shim (5,C). The shim is essentially transparent when calculating a legacy hash and a legacy digital signature.

Figure 6:
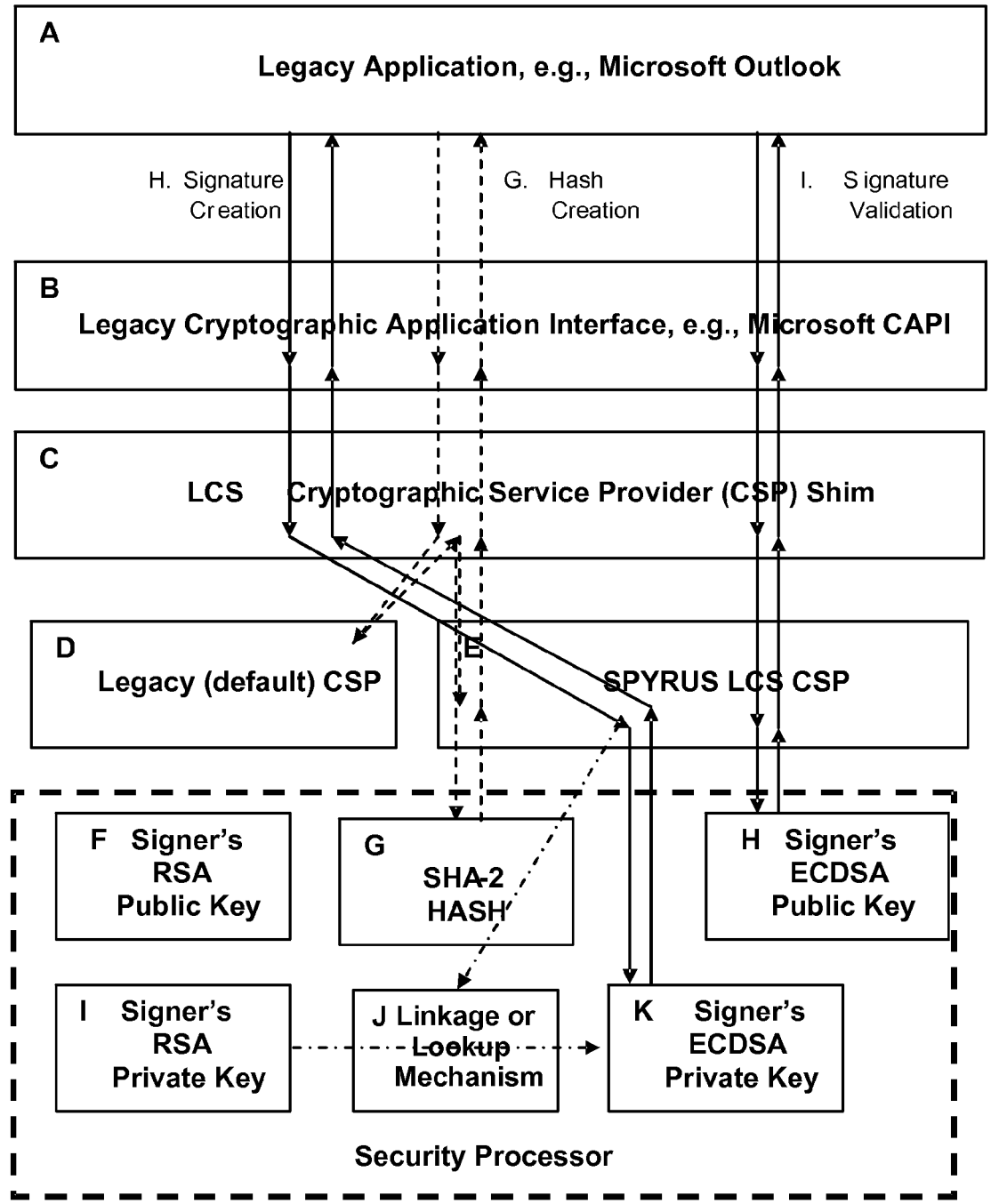
FIG. 6 is a block diagram that illustrates an architectural layer stack and signature creation and validation in an LCS configuration according to a preferred embodiment.

FIG. 6: Architectural Layer Stack: LCS Signature Creation and Validation in LCS Configuration FIG. 6 illustrates the process of creating a legacy hash value, e.g., SHA-1, together with the computation of an advanced, e.g., SHA-256 or SHA-384 hash value. As described in the detailed description, it may or may not be necessary to compute both the advanced hash ("SHA-2") and the legacy hash (SHA-1, or even MD5) in all cases. Instead, it may be possible to compute the advanced, longer hash and simply truncate it for use as a "handle" or table look-up reference. However, some legacy applications may need to match that value with the same algorithm they use. In that case, it may be necessary to calculate the primary value and a "shadow" value.

As in the previous cases, the process begins with the initiation of the hash value calculation (6,G) within the legacy application (6,A). In this case, however, unlike the previous cases, the LCS CSP Shim function is responsible for effectively "splitting" the original request into two components. The first component is the legacy hash value, which is computed within the legacy (default) CSP (6,D). The second component is the advanced hash algorithm, which may be computed in software within the LCS CSP, e.g., the SPYRUS LCS CSP (6,E), or within the security processor (6,J). Which approach is taken is up to the implementer, and may depend primarily on the I/O throughput to the module, and the availability of the hash functionality on that module.

The hash result that is returned to the legacy application is the legacy hash value, since that is all that it understands, and it may have allocated just enough buffer space for it, and no more.

For this reason, it may be necessary to store the advanced hash value (6,G) somewhere, either within the security processor or in the LCS CSP, and to provide a lookup mechanism (6,J) whereby the advanced hash value can be retrieved for future use, e.g., when creating the digital signature.

Once the two hash values have been computed and the legacy hash value returned to the legacy application (6,A) to be stored temporarily, the legacy application initiates the signature creation process (6,H), using what it "thinks" is a standard legacy (RSA) signature, using the legacy Cryptographic API (6,B).

The signature request is passed through the legacy Crypto API and then to the LCS CSP Shim (6,C). The LCS CSP Shim recognizes that an advanced digital signature is required, and routes the modified request to the LCS CSP (6,E), providing the Key ID of the signer's RSA private key (6,I) in the process. The LCS CSP invokes the linkage or look-up mechanism (6,J) (either directly, within the CSP, or indirectly, through the cryptographic token) in order to determine the key ID of the advanced digital signature mechanisms, e.g., the Signer's ECDSA private key, and then calls the advanced signature algorithm with the advanced algorithm key, instead of the using the expected legacy signature algorithm and key.

Once the advanced signature algorithm result is obtained, it is packaged in the form of a conventional RSA signature by either the LCS CSP (6,E) or the LCS CSP Shim (6,C) and returned to the legacy application (6,A) for storage and/or transmission.

Figure 7:
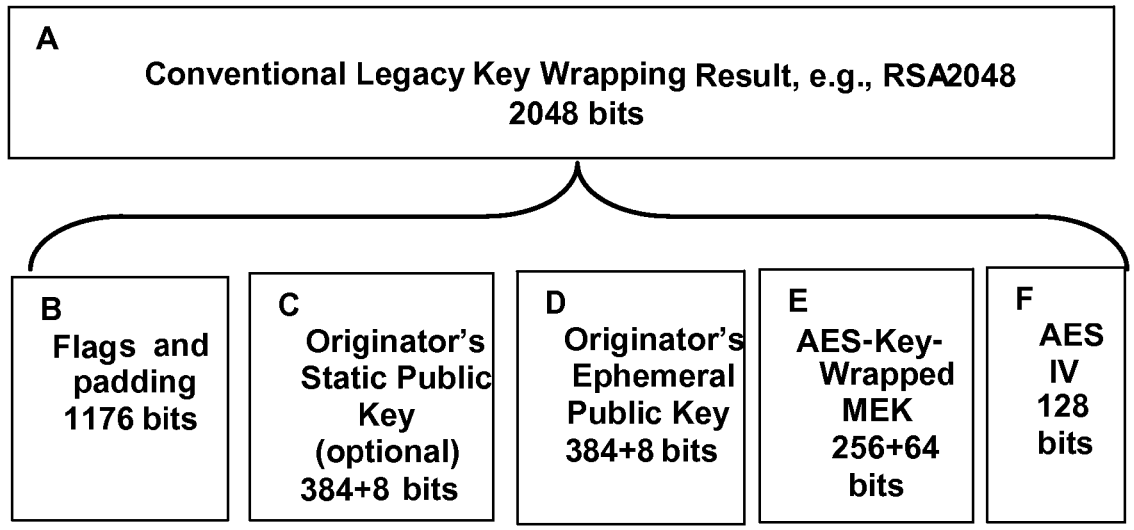
FIG. 7 is block diagram that illustrates a layout of an LCS key wrapping result according to a preferred embodiment.

FIG. 7: Legacy Key Wrapping Block Layout

FIG. 7 illustrates the field layout of a LCS key wrapping result (e.g., EC Diffie-Hellman), encapsulated in the form of a legacy key wrapping format, e.g., RSA-2048.

The legacy key wrapping field (7,A) contains an internal structure known to the LCS implementation. The Flags and Padding block (7,B) contains 1176 bits, and may contain application specific version numbers and other information as may be required. In order to be a valid RSA encryption result, the higher order bit must be a 1.

The second field (7,C) is optional, and contains the originator's static public key. It would be used in the case of a One-Pass ECMQV implementation, where both the originator's and recipient's public keys are used. The compressed form of the public key is used, consisting of 384 bits (for P-384) plus 8 bits for the standard key flag bits used to indicate the compressed, uncompressed, or hybrid format.

The third field (7,D) contains the originator's ephemeral public key, and again consists of 384 plus 8 bits.

The wrapped (encrypted) Message Encryption Key (MEK) (7,E) is shown in the fourth field. The AES-256 key is wrapped in the Key Encrypting Key that is derived from the EC Diffie-Hellman or ECMQV key agreement algorithm and subsequent key Derivation function. The AES Key-Wrap algorithm is used, and requires 256 plus 64 bits for an AES-256 key.

The final field (7,F) contains the 128-bit Initialization Vector (IV) used during the message encryption operation. Note that the IV could also be included within the wrapped Message Encryption Key key-wrapped blob, which might provide an additional level of security by keeping both the key and the IV secret.

Figure 8:
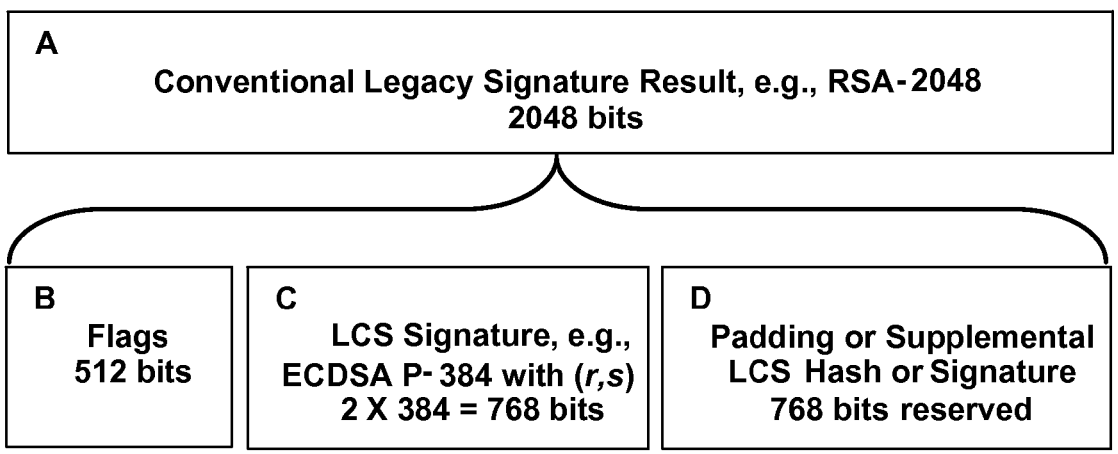
FIG. 8 is a block diagram that illustrates a layout of an LCS signature result according to a preferred embodiment.

FIG. 8: Legacy Digital Signature Block Layout

FIG. 8 illustrates the result of packaging an LCS signature in the form of a conventional legacy signature block, e.g., RSA-2048 (8,A).

Flag bits (8,B), including a high-order 1 bit, are provided in the first field, which totals 512 bits.

The LCS signature is represented in the second field (8,C). The two (r,s) components of an ECDSA signature require 384 bits each, or 768 bits total.

The final field (8,D) is reserved for either random padding or a supplemental LCS signature that may be required in certain cases. For example, the S/MIME protocol does not digitally sign the body of the message directly. Instead, the protocol computes a hash of the message (using the legacy hashing algorithm), and records that in a message block reserved for that purpose. Unfortunately, the space that is allocated for this purpose is determined by the legacy application, and attempting to include a longer hash value might (or might not) cause a buffer overflow. That message body hash is then itself hashed, and it is this final hash that is used to compute the digital signature.

If the advanced digital signature were calculated over the message hash block, that would apply a strong hash over a short and not very important block, while using the weaker, legacy hash mechanism to protect the body of the message. This is certainly not desirable from a security point of view, and so it is necessary to find some other place to convey the advanced hash and/or signature of this other information. Although not "optimum" from an architectural layering point of view, conveying the additional information in this manner is the only reasonable and available option. 768 bits are therefore reserved for either a hash (normally only 384 bits) or an ECDSA P-384 signature (requiring 768 bits).

With reference to one embodiment of the invention for generation of a P-384 ECC key, if an uncompressed form were used for the ECC keys, the x and y coordinates would require a total of 768 bits, which is an allowed but uncommon RSA key size. A P-521 key would be even more unusual, since it would require 1042 bits. One embodiment of the invention uses an alias, and wraps the ECC public key in a certificate by calling it an RSA-768 or RSA-1042 key. This will require the cooperation of the Certification Authority ("CA") that issues the certificate, because the method has to emulate the normal proof-of-possession requirement.

In one embodiment, the One-Pass Diffie-Hellman key establishment protocol may be implemented instead of the RSA key exchange protocol. This requires that the originator use an ephemeral key pair plus the static public key of the recipient. The recipient's static public key would be extracted from the (adapted) certificate, and the originator's ephemeral key pair would be generated on the fly, as required.

The shared secret, Z, is then computed by the originator by multiplying the originator's private ephemeral key times the recipient's static public key, in accordance with the EC Diffie-Hellman key agreement scheme. The recipient has to receive the originator's public ephemeral key and the MEK, encrypted in the Transport Encryption Key (TEK) that is derived from the EC Diffie-Hellman shared secret. Although there is only one field—the one that would normally contain the RSA-wrapped TEK—point compression can be used to represent the x-coordinate of the originator's P-384 public key in only 384 plus 8 bits, or 392 bits total. This leaves 768−392=376 bits left over, which is more than enough to fit in the RSA-wrapped TEK field. For example, an AES-256 TEK key will fit with 120 bits to spare.

There is, however, another detail that must be dealt with, and that concerns the length of the Initialization Vector (IV) that is used as the starting point for certain cryptographic Modes of Operations, such as the commonly used Cipher Block Chaining mode. Because the AES algorithm uses a 128-bit block size, the Initialization Vector is required to be 128 bits long as well. However, the existing controls structures provided by legacy applications may not handle a longer Initialization Vector than the 64-bit IV normally used with triple-DES. Instead, the existing structure can be used to convey 64-bits of the IV, and the remaining 64-bits can be included within the field that would normally contain the RSA-wrapped TEK. The remaining 56 bits in this field may be used for some other purpose, such as a unique code or other signal used to differentiate an ECC key from a valid RSA key. If a longer RSA key was specified initially, the entire IV could be included along with the RSA-wrapped TEK and possibly other information as well.

Because a normal Cryptographic Service Provider (CSP) provided by Microsoft (or a similar cryptographic service interface provided by another vendor) would not properly interpret the substitution of an ECC-wrapped TEK for the RSA TEK, a modified CSP will be substituted. As is evident to one of ordinary skill in the art with reference to this disclosure, this can be done in exactly the same way that an AES CSP is substituted for the standard Microsoft CSP in an Outlook plug-in.

If the key-length encoding convention is used to signal the presence of the ECC key, the substitute CSP would look at the peculiar 768-bit "RSA" key, surmise that it is really an ECC key, and then completely ignore the encoded object identifiers (OIDs) for the public key encryption and symmetric key encryption, and use ECC and AES-256 instead. The symmetric encryption OID would be AES-256, so that the right size Initialization Vector (IV) would be generated. Alternately, if the ECCKeyAttribute certificate attribute extension is used, the presence of that field would accomplish the same signaling methodology. In the later case, the LCS shim would substitute the ECC key (extracted from the certificate) and pass it to the CSP appropriately.

In a further embodiment, this key exchange could be accomplished with elliptic curve Menezes-Qu-Vanstone (ECMQV) or the One-Pass Unified (Diffie Hellman) Model, with a larger bit space. Both of those schemes involve a static key plus an ephemeral key at the originator, plus a static key (used twice) from the recipient. For example, again assuming a P-384 ECC key, the recipient needs to be sent 392 bits for the originator's point-compressed static key, another 392 bits for the originator's point-compressed static ephemeral key, and 256 bits for the encrypted MEK. So that means that a modified RSA key is needed that is at least 392+392+256 bits, or 1040 bits. In addition, at least another 64 bits are required for the 128-bit Initialization Vector, or 1104 bits in total. Normally, RSA keys have to meet a minimum size and be a multiple of a defined increment, e.g., 512 bits. In that case, an implementation of the invention might use 1024+512=1536 as the next quasi-standard size for an "RSA" key.

In an alternate embodiment, the fact that such modification was employed could be flagged in the certificate, through the use of a special certificate attribute extension, in which case the "standard" key sizes (1024 and 2048 bits) could be used, with space left over. This space (2048−1024=1024 bits, or 128 bytes) would be available for other uses, including the provision of supplementary information to be used by the Key Derivation Function when re-deriving the TEK, as required by NIST SP 800-56A.

From the perspective of the CSP for ECMQV or One-pass Unified Model, the originator's static key needs to be passed to the CSP as a parameter. In one embodiment, the correct static key pair to be used for that purpose is provided through some kind of an out-of-band mechanism, such as by indicating a default key pair to be used in the Registry.

In addition to providing a suitable mechanism for carrying out the key exchange operation required to encrypt a message, it may also be necessary to provide a digital signature mechanism as well.

Because the ECDSA signature algorithm that is used as part of the advanced Suite B protocols is considerably more compact and of considerably greater strength than an RSA signature of the same length, the ECDSA signature can be contained within the size field that is normally used to contain an RSA signature. An ECDSA P-384 signature, for example, uses two parameters, (r, s), totaling only 768 bits, yet is considered to be the equivalent in strength of a 7,680-bit RSA key and signature.

As will be discussed, there is an additional practical difficult that might present itself, in that the SHA-1 hash that is normally used for legacy applications is actually shorter than the newer "SHA-2" algorithms, notably SHA-224, SHA-256, SHA-384, or SHA-512. The invention therefore proposes a mechanism for calculating the longer hash and truncating the result, so that the truncated result can later be used as an index into one or more cached results, in order to pass in the correct result to the digital signature or signature validation process. In alternate embodiments, both the legacy SHA-1 hash algorithm and the advanced SHA-2 hash algorithm can be used to calculate two different hash values either in parallel or sequentially, but essentially simultaneously, for those applications that require the legacy hash for some other reason. The legacy hash value can still be used as an index, "handle," or other look-up mechanism to associate the cached result of the advanced hash algorithm with that of the legacy algorithm.

Dual-Key Certificate Generation Using a Legacy CA

Consideration has been given to generating ECC keys within the SPYRUS Signal Identity Manager and the Microsoft CA. However, Microsoft has stated that this capability will not be supported in legacy operating systems and applications (i.e., before the Windows Vista client and the Windows Server codenamed "Longhorn"), and such CAs are not expected to be deployed widely until well after that event, i.e., in 2009 or later.

Consideration has also been given to implementing the Dual-Key generation capability with the SPYRUS Signal Identity Manager Operator Console component, injecting it into the Microsoft CA as part of the To Be Signed certificate prototype.

Instead, the preferred embodiments create a new X.509 certificate extension attribute, called the ECCKeyAttribute, that will be included in the initial certificate management request. This attribute will contain the ECC key and other necessary information, providing two keys within one certificate. The processing required by this certificate attribute extension can be registered with the Microsoft CA in the same manner that other proprietary or special-purpose extensions are supported.

Because the certificate will be signed with the RSA algorithm, all of the normal Microsoft certificate path validation mechanisms will apply, and the extended certificate should be processed through the normal certificate path validation mechanism without difficulty, across virtually all PKI-enabled operating systems and applications.

For the sake of simplicity, and as a convenient way of signaling what kind of an ECC key should be generated at the time of the initial key generation and certificate management request, the size of the RSA key that is specified by the user, using the normal legacy Graphical User Interface can be used to select the size of the ECC key. In the case of an RSA-1024 key, a P-256 ECC key will be generated and associated with it. In the case of an RSA-2048 key, a P-384 key will be generated and used. The RSA keys will be marked as either a Key Encryption key or a Digital Signature key in the Key usage field. The Nonrepudiation bit need not be supported. A P-521 ECC key could also be supported, if desired.

Those skilled in the art will recognize that the cryptographic strength provided by the use of an RSA-1024 or even an RSA-2048 signature to sign the certificate is considerably less than the strength of the ECC keys that are incorporated within the certificate. This may not be terribly relevant, however, because the binding of the key to the information contained within the certificate only has to endure for the validity period of the certificate itself, which is typically one to three years. The end user's ECC key, however, may be used to encrypt or digitally sign data that must be protected for many decades. If this disparity of key strength is a significant issue, an additional signature block could be added to the certificate that would use ECDSA with a comparable strength ECC key. The modified CSP could validate this signature prior to using the certificate.

Encapsulation of ECC Encryption

The adoption of ECC within a Microsoft Windows environment, as well as on other operating systems and applications, is expected to be a relatively slow process, as it will require the replacement of a vast majority of legacy operating systems and applications before the applications that consume ECC can be supported.

For that reason, ECC probably will not be supported on a majority of client computers until well after 2010. Even then, people will need to acquire ECC certificates, exchange them, and be sufficiently motivated to make the change away from RSA. Based on that scenario, it might be 2015 before the use of ECC becomes ubiquitous for secure communications, e.g., secure e-mail, except in certain communities where its use may be mandated.

The current invention offers an alternative for people who wish to use the Suite B or similar advanced algorithms at an earlier date, through the use of tokens and suitable middleware, and a process of encapsulation. Several approaches have been considered, but most of them involve including an ECC public key within a certificate that is signed with RSA, and therefore can be accepted by the Microsoft Windows certificate path validation mechanism.

Encapsulating ECC Keys within End-User Certificates

The primary barrier to making ECC available within the Windows operating system is the certificate path validation software that is part of the operating system. Prior to the Longhorn/Vista release, that functionality is not easily changed or replaced, and at present it doesn't handle any "strange" algorithm IDs, including ECC key establishment or ECDSA. In fact, it takes special processing just to get Outlook, for example, to accept AES as a symmetric encryption algorithm, even if a CSP supports it.

As discussed previously, however, it is feasible to encapsulate an ECC key within a certificate that is signed with RSA, thereby making the encapsulated ECC key appear to be "normal" so that it can be accepted by the certificate path validation software. There are several ways that this could be accomplished.

Dual Key Certificate Structure

The simplest approach would be to include an ECC key within the certificate in a special certificate attribute extension. The certificate in this case would contain two keys—an RSA key defined in the normal manner, and an ECC key defined in the attribute extension.

The ECC key could also be signed by a higher-level CA using ECC keys, giving rise to two parallel certificate paths—a certificate within a certificate.

Although RSA-2048 with SHA-1 doesn't meet the definition of Suite B, there is presumably little likelihood that either RSA-2048 or SHA-1 is going to be broken in the next year or two. Since the certificate signature is not being used to sign relevant data, but only the binding between a user's identity and the public key, the strength of that binding only needs to be sufficient to withstand attacks over the duration of the certificate validity period, which is typically one to three years.

Including a normal RSA public key also means that the same certificate could be also used for normal RSA-based S/MIME communications, and for applications that make use of the stronger Suite B algorithms. This provides a very useful dual-use capability, capable of supporting a mix of users, some of whom have Suite B capabilities and some of whom do not. For example, this capability can be used to support the Smart Card Logon protocol, or the SSL or TLS mutual authentication protocol, until the deployment of advanced algorithms on both clients and severs becomes more commonplace.

X.509 allows arbitrary certificate attribute extensions to be included within a certificate, so including an ECC key attribute extension would be possible.

Microsoft Windows allows an application to register a particular certificate attribute extension OID together with the name of a handler routine in the Registry, so that if that extension is seen, the proper handling routine will be called.

Appropriate middleware, such as is available from SPYRUS, would register an appropriate handler routine to intercept the normal processing of that key, and handle it as an ECC key instead. Meanwhile, the certificate would be validated properly by the certificate path validation software, based on its RSA or DSA signature.

The ECCKeyAttribute extension needs to provide several pieces of information that would normally be carried in the certificate, but in this case will be (potentially) different from the properties of the RSA key.

The fields within the ECCKeyAttribute will include the KeyUsage and ExtendedKeyUsage fields.

In addition, because the ECC key is a different key from the RSA key in the certificate, it needs its own subjectKeyID, a 160-bit or larger random number or a SHA-1 or other hash of the key.

Finally, in order for the processing program, for example the SPYRUS CSP, to be able to find the ECC key, some of the information that would normally be derived from the certificate registration process may need to be carried separately, in particular the container name of that key on the token.

ECC Key Attribute Extension

The following, in ASN.1 notation, is useable in the invention:

```
eCCKeyAttribute      ::=   SEQUENCE {
    eCCKeyUsage              ::= ECCKeyUsage,
    eCCExtendedKeyUsage      ::= ECCExtKeyUsageSyntax,
    eCCSubjectKeyID          ::= OCTET STRING SIZE(20),
    eCCKeyContainerInfo      ::= ECCKeyContainerInfo
                             }
ECCKeyUsage ::= BIT STRING {
    digitalSignature        (0),
    nonRepudiation          (1),
    keyAgreement            (4),
    encipherOnly            (7),
    decipherOnly            (8) }
id-ce-extKeyUsage OBJECT IDENTIFIER ::= { id-ce 37 }
    ExtKeyUsageSyntax ::= SEQUENCE SIZE (1..MAX) OF
    KeyPurposeId
    KeyPurposeId ::= OBJECT IDENTIFIER
anyExtendedKeyUsage OBJECT IDENTIFIER ::= { id-ce-extKeyUsage 0 }
    id-kp OBJECT IDENTIFIER ::= { id-pkix 3 }
id-kp-emailProtection         OBJECT IDENTIFIER ::={ id-kp
                                                 4 }
    -- E-mail protection
    -- Key usage bits that may be consistent: digitalSignature,
    -- nonRepudiation, and/or keyAgreement.
ECCKeyContainerInfo     ::= SEQUENCE OF {
eCCKeyContainerName    ::= utf8string size (1..20),
eCCKeyType             ::= ECCKeyType DEFAULT(ECC),
eCCKeyParameters       ::= SuiteBCurveType DEFAULT(P256).
                        }
ECCKeyType             ::= INTEGER (ECC(0), ECKCDSA(1) )
SuiteBCurveType        ::= INTEGER (P256(0), P384(1), P521(2) )
```

In addition to these definitions, it would be desirable to extend the SMIMECapabilities attribute to register the types of symmetric keys that are supported (AES-128/192/256), the SHA-2 hash functions supported (SHA-256/384/512), the ECC Key Establishment Schemes supported (One-Pass ECMQV, One-Pass Unified Model, One-Pass Diffie-Hellman), and the Key Derivation Functions supported (concatKDF-with-SHA256, concatKDF-with-SHA384, concatKDF-with-SHA512).

These extended attributes are only for use with S/MIME. A more extensive list would apply in the case of other protocols.

RSA Key Watermarking

In yet another embodiment of the invention, the "RSA key watermarking" technique of Anna Johnston (C.f. Anna M. Johnston, Cryptology ePrint Archive: Report 2001/013, http://eprint.iacr.org/2001/013.) could be used to create an RSA key that would actually contain an ECC key within the high order portion of the RSA public key. This would produce an RSA key that would (to all intents and purposes) look like a valid key, and could in fact be validated using the standard methods, yet would contain a much stronger ECC key for those who knew how and where to look for it.

Encapsulating Suite B within an RSA Certificate

Encapsulating ECMQV within RSA Key Blobs

Once an ECC key that is embedded in a certificate can be accepted by the certificate path validation software, encryption can be implemented. In one embodiment, it is necessary to encapsulate ECMQV within a "standard" S/MIME RSA encryption field in order to use AES (up to AES-256) and ECC (up to ECC P-384) keys (as defined by the Suite B preferred algorithms and keys sizes) to encrypt e-mail securely. The next step would be to encapsulate the necessary information for a key establishment protocol such as EC Diffie-Hellman or ECMQV within the confines of a standard RSA encryption "blob."

Normally, an RSA encryption blob would consist of a symmetric key such as a triple-DES or AES key, plus padding to bring the length up to the size of the public key that is being used. That information is then RSA encrypted in the public key of the recipient.

More information is required in the case of ECMQV, but fortunately, there is more than enough room for it all within an RSA-2048 envelope (see FIG. 7):

---

Flag Field : Originator's Static Public Key : Originator's Ephemeral Public Key : AES Wrapped Key

---

The Flag Field, shown in single underline, will contain 684 bits or more of structured data in the case of an RSA-2048 envelope, as discussed below. In the case of an RSA-1024 envelope, used for a P-256 key, the Flag Field will be shorter.

The originator's Static Public Key field, shown in double underline, is necessary because S/MIME would not normally carry the originator's certificate or public key, assuming that the Key Establishment Scheme being used makes use of an originator's static public key. The size of the originator's static public key would be 257, 385, and 522 bits for a P-256, P-384, and P-521 public key, respectively, in point compressed form. Point compression will be necessary if everything is to fit within the RSA-2048 envelope.

The originator's Ephemeral Public Key, shown in broken underline, is necessary for any Key Establishment Schemes that make use of an ephemeral key. The size of the Ephemeral Public Key will again be 257, 385, (or 522) bits.

The AES wrapped key is the S/MIME Message Encryption Key, wrapped in an AES key wrap format using the Derived Keying Material (KeyData) generated by the Key Derivation Function. The size of the AES Wrapped Key will be 64-bits larger than the Message Encryption Key, or a maximum of 320 bits.

The precise format of the Flag Field is a design choice, but the first 256 bits could be a deterministic pattern, e.g., all zeroes or some pseudo-random pattern, or a hash of the following data that follows, to provide an additional double-check signal to the software (such as SPYRUS software) that this was an ECC-wrapped key, and not a true RSA-wrapped key. In addition, the format should include the type of ECC Key Establishment Scheme to be used. To be completely general, optionally the values to be used in the Key Derivation Function (KDF) would be encoded such as the hash function to be used, and the type of key establishment scheme, in case someone wants to use something other than ECMQV.

The use of the recommended Concatenation KDF may be assumed.

As discussed below, the Flag Field must contain the information necessary to compute the contextID field used in the Key Derivation Function.

As discussed previously, it may or may not be necessary for some or all of the Initialization Vector (IV) to be carried in the Flag Field as well, depending upon the behavior of the legacy application when presented by a longer IV than is normally handled. If necessary, the standard triple-DES IV (64-bits) can be extended (or replaced) by additional information conveyed in the Flag Field, as necessary to convey the 128-bit IV required by AES.

Finally, a sequence of offsets for the start of each subsequent field should be provided in the Flag Field, followed by random data padding to fill up the RSA-1024 or RSA-2048 envelope.

ContextID Field Contents

According to NIST SP 800-56A, the OtherInput to a Key Derivation Function consists of contextID, keydatalen, and optionally SharedInfo.

The contextID field is intended to contain the "identifiers of the participating parties." The specific details may be left to the implementers.

However, an elliptic curve variant of the Korean Certificate-Based Digital Signature Algorithm (EC-KCDSA) standard uses an interesting construct that is worth considering. Instead of merely relying on the public key to authenticate a transaction, that standard includes a hash of the entire certificate concatenated with the message. As a result, there is no possible ambiguity as to which certificate was being used to sign a particular transaction. (Without specifically identifying the certificate somehow, there is the possibility of two or more certificates containing the same key causing ambiguity. For example, a certificate could have been renewed with a change of name or title, or if the user obtained two different certificates for the same key, maybe even with two different names, perhaps in order to cause exactly this kind of possible confusion.)

Even if a key establishment scheme other than ECMQV was used, the originator can be required to have a certificate to be used as the default originator's certificate. And in the case of ECMQV, the One-Pass Unified Model, or static Diffie-Hellman, a certificate and static key would be required in any case.

Preferably, the certificate is identified by Issuer name and Serial number, to make it easier to find that particular certificate. However, that approach may be problematic if a sufficient amount of space does not exist within the RSA key wrap envelope to include that much information, as it may depend on the length of the originator's Issuer name. Instead, a hash of the originator's certificate, plus a hash of the recipient's certificate as the contextID, would be useable. Preferably, this would be a SHA-256 or longer hash, in order to be compliant with SP 800-56A and consistent with the intent of the Suite B algorithms standard to use strong hashes.

Within a CSP that is useable for substituting ECMQV for an RSA encryption operation, all that is likely to be known about the recipient is their RSA public key, because the certificate will have already been parsed and the key extracted by higher level routines. One possible way to locate and extract the information from within CSP is to look up that public key in the Microsoft Certificate store, find the certificate, extract the ECC key from it, and proceed with the ECMQV and KDF functions.

Having to hash all of the certificates in the certificate store in order to find the correct one would be an unnecessarily time-consuming process. Fortunately, the Microsoft Windows operating systems compute a "thumbprint" hash of the public key and saves that along with the rest of the certificate information in the certificate store. It also computes a thumbprint of the entire certificate, and makes that available as well.

Assuming that the software can find the default originator's certificate (one likely location is the Registry), then the thumbprint can be used to unambiguously identify the originator's certificate, and the thumbprint of the specified recipient's certificate can also be found (by a look-up process) as well.

As a result, the contextID input to the Key Derivation Function for this application is likely to consist of the two fixed values, concatenated as follows:

contextID=SHA-1(originator's certificate)∥SHA-1 (recipient's certificate)

It is not essential to specify an algorithm ID for parsing the output of the KDF, as it may be assumed that it is an AES key. So keydatalen will specify L, the length of the key wrapping key (Transport Encryption Key) in bits. The size of the final wrapped key will be L+64 bits, because of the way the AES key wrapping algorithm works.

Except in the case of static Diffie-Hellman, where the SharedInfo is required to contain a nonce, the SharedInfo field is not normally used.

Encapsulating ECDSA Signatures in RSA

The same mechanism can easily be used to encapsulate an ECDSA signature within a standard RSA signature envelope. Normally an RSA signature would be formatted as a Public Key Cryptography Standard (PKCS) #1 object that contains a named hash function and the hash value, plus the required padding. In the case of ECDSA, however, the hash value is not incorporated directly as part of the signature. Instead, the message digest or hash is included within the ECDSA computation, and a pair of values, (r, s) are produced, where r and s are the length of the ECC key used.

Although a P-521 ECDSA signature cannot be encapsulated within an RSA-1024 signature field, it would fit comfortably within an RSA-2048 signature.

Computing a "SHA-2" Hash for Inclusion in a Legacy Application

The hash value used to compute an ECDSA signature is carried within the ECDSA signature itself, and doesn't absolutely need to be conveyed separately—the text in question could be hashed, and the result included within the ECDSA signature. However, the way that most legacy programs function is that the hash is computed separately, normally in software, and then that hash is digitally signed, either in hardware or software. For that reason, it is typically the case that the hash of the message is computed independently of the signature operation, and later passed in to that process. That process in turn gives rise to the possibility that the legacy code may be using either the MD-5 hash algorithm (providing a 128-bit result) or the SHA-1 hash algorithm (providing a 160-bit result). In either case, the desired "Suite B" hash length (normally SHA-256 or SHA-384) may not fit within the existing data structures.

There are several ways that this difficulty could be overcome without having to rewrite the entire application. In the preferred embodiments, the replacement CSP would calculate the desired "SHA-2" hash value and then cache that value locally. The longer hash value would then be truncated to fit the size hash that is expected, e.g., 160 bits for SHA-1, and that shorter value passed through whatever legacy command structures may be used. However, when the hash value is passed to the digital signature CSP, the shorter MD-5 or SHA-1 hash value would be used as an index or table lookup mechanism to retrieve the longer "SHA-2" hash, and that value would be passed in for the ECDSA computation. A similar approach would be used to validate a digitally signed document, even if the shorter hash value is transported through some explicit structural mechanism.

An alternate embodiment can be used if the legacy application is constrained to actually using the legacy hash mechanism for some reason, e.g., as a "thumbprint" that must be exchanged with other mechanisms that are not (yet) to be replaced, or to facilitate interoperation with other users with existing, unmodified legacy applications. In this case, rather than calculating only a single hash value and then truncating that value to the required length, it would be possible to calculate both the legacy hash algorithm and the replacement, stronger hash algorithm. With such an approach, the legacy algorithm could still be used as an index, "handle," or table look-up mechanism to associate, retrieve, and process the stronger hash value.

LCS Key and Certificate Generation

As described previously, the preferred embodiments of the invention make use of a unique LCS Key and Certificate Generation capability, for the sake of simplicity until ECC operations are more widely supported. This tailored, proprietary application is written to take advantage of the characteristics of the Cryptographic Service Provider Shim illustrated in figure (1.C and 1.D) to generate an RSA key pair followed by one or more ECC key pairs. After the RSA and ECC key pairs have been collected, an X.509 certificate is created that not only includes the RSA public key in the standard format, but also one or more ECC keys in a unique ECCKeyAttribute certificate extension. That X.509 certificate can then be published in a directory in the normal manner, and/or returned to the user to be distributed via e-mail or other means.

An Outlook Plug-In

It is possible to develop a plug-in for Microsoft Outlook, other e-mail programs, or other cryptographic programs that would allow it to use AES symmetric key encryption when used in combination with a custom CSP. Such a plug-in works by scanning all of the certificates in the user's certificate store, and looking for an SMIMECapabilities OID in the certificate that specifies that the user is capable of accepting AES encrypted e-mail. When it finds such a certificate, it changes the registration of that certificate to point to the custom CSP, rather than the Microsoft default CSP.

This same technique can be used to register a certificate with a custom CSP, but in one embodiment, it would be looking for a custom ECCKeyAttribute extension.

Finding the Necessary Keys and Certificates

In one embodiment, the existing S/MIME AES plug-in is modified to scan all of the certificates in the Microsoft Windows "Other People" certificate store, looking for the ECCKeyAttribute attribute, as opposed to the present SMIMECapabilities search. In addition, any certificates in the Personal certificates store are also examined. Any certificates that are found that contain the ECCKeyAttribute attribute will be registered to the custom ECC CSP. As a result, any attempt to reference the RSA public key contained in such a certificate will be routed to the SPYRUS CSP.

However, by the time the CSP is called, the certificate will have been parsed by Outlook or some other Microsoft service, and all that will be available will be the RSA public key. Given that RSA key, it is necessary to find the corresponding ECC key before the ECMQV or ECDSA operation can be implemented. Fortunately, Microsoft parses the certificate at the time the certificate is enrolled, and creates a hash or thumbprint for the public key, and a thumbprint of the original certificate. To find the right certificate, the CSP will have to calculate a hash of the RSA public key, and then look through the certificate store to find a certificate that contains that public key.

Once the certificate is found, the ECCKeyAttribute extension can be parsed, and the ECCKeyContainerName extracted. Given the key container name, the public and private keys can then be identified on the token. Similar processes may be used or adapted within other operating systems and applications.

Overriding the Symmetric Key Algorithm Choice

In addition to using ECMQV (or EC Diffie-Hellman or similar protocol) for the encryption, the CSP will override the selection of the symmetric key algorithm, regardless of what it is (triple-DES, RC4, CAST, or whatever). If the SMIME-Capabilities attribute is present in the certificate and specifies an AES key length, then that key length will be used if it is at least as strong as the equivalent strength of the ECC key, according to the Suite B standard. That is, if the ECC key is P-256, then AES-128 or greater may be used. If the ECC key is P-384 or greater, then the Suite B preferred key size of AES-256 should be forced, regardless of what the user might have specified.

ECC Key Usage Field

The Internet Engineering Task Force (IETF) Request for Comment (RFC) 3280 has defined some useful extensions to the Key Usage field of an X.509 v3 certificate. But in order to understand the potential usefulness of these indicators, it is necessary to consider the advantages of some of the key establishment schemes defined in NIST SP 800-56A.

The advantage of the One-Pass and Full Unified model (and ECMQV) is that the initiator has assurance that the shared secrets will not be reused, and more important, that the compromise of the initiator's private key cannot compromise prior or future shared secrets, even if the compromise is not detected.

The significant advantage that ECMQV has over the One-Pass and Full Unified model is that it can also be used for Authenticated-Data, as opposed to Enveloped-Data or Signed-Data within S/MIME. See RFC-3278 for details. This allows the sender of a message to be authenticated independently of the author of the document, and helps to clarify the distinction between two-party document authentication and third-party nonrepudiation. It would also be much faster than using ECDSA or even RSA when some kind of originator authentication is required.

Obviously, the compromise of the recipient's private key would compromise all secrets ever shared with that user's key, both in the past and in the future. Since in the case of S/MIME the recipient is usually blind-copied (bcc'ed) on the message so he can later read it himself, this argues that users should use one static private key for encrypting messages (and for attribution without signature) and a different private key for decrypting his own messages. For example, the encrypting key pair could be stored on a trusted platform module (TPM) device, with the decryption key kept on a removable security module.

RFC 3280 defines the keyUsage flags as follows:

```
id-ce-keyUsage OBJECT IDENTIFIER ::= { id-ce 15 }
    KeyUsage ::= BIT STRING {
        digitalSignature        (0),
        nonRepudiation          (1),
        keyEncipherment         (2),
```

-continued

```
        dataEncipherment        (3),
        keyAgreement            (4),
        keyCertSign             (5),
        cRLSign                 (6),
        encipherOnly            (7),
        decipherOnly            (8) }
```

The relevant text concerning these bits includes the following:

The keyAgreement bit is asserted when the subject public key is used for key agreement. For example, when a Diffie-Hellman key is to be used for key management, then this bit is set.
The meaning of the encipherOnly bit is undefined in the absence of the keyAgreement bit. When the encipherOnly bit is asserted and the keyAgreement bit is also set, the subject public key may be used only for enciphering data while performing key agreement.
The meaning of the decipherOnly bit is undefined in the absence of the keyAgreement bit. When the decipherOnly bit is asserted and the keyAgreement bit is also set, the subject public key may be used only for deciphering data while performing key agreement.

So, in preferred embodiments, the originator's ECC public key should be marked with the encipherOnly bit, and the recipient's ECC keys (including the originator's second decryption key) should be marked with the decipherOnly bit.

S/MIME Capabilities

S/MIME (and Outlook) provides two different methods for communicating the capabilities of a potential recipient to an originator.

If the sender of a signed message checks the appropriate box, then his certificates will be sent along with the message, together with an indication of what algorithms that client supports. This approach requires that every pair of potential communicants exchange a signed message before they can communicate securely, which is generally undesirable.

For that reason, the SMIMECapabilities certificate extension was devised, so that anyone who was able to retrieve someone's certificate (e.g., from a directory) would know what algorithm capabilities they supported, assuming that each e-mail client they happen to use actually supports the indicated capabilities.

To date, the SMIMECapabilities extension has been used to indicate what symmetric key algorithms were supported, it being assumed that all clients supported RSA.

Now, however, the capabilities of various clients may cover a much broader range. Although the ECC key lengths and curve types supported can be derived from the certificate, it will be necessary to know which of the various SHA-2 hash algorithms are supported, what key lengths of AES are supported, and most importantly, which of the various key establishment schemes, KDF functions, and Key Confirmation functions are supported. To date, those functions have not yet been standardized within the SMIMECapabilities extension.

Putting it all Together

Preferably, the above "ingredients" are combined, i.e., a CA capability and/or self-signed certificates, an ECC public key that is encapsulated within an RSA certificate, and an encapsulated ECMQV and ECDSA capability within an S/MIME encoded message. The result is a plug-in for Outlook that transparently encrypts S/MIME messages using ECMQV and AES. The results will be backwards compatible with Windows XP and Windows Server 2003 at a minimum.

Suite B Secure E-Mail (Outlook)

No changes would be required to the user's e-mail setup with this approach, so it shouldn't matter whether they are using Microsoft Exchange, POP3, or some other mail server. It should also be completely transparent with respect to the ISP that is being used, since it is a desktop-to-desktop solution.

Suite B File Encryption

Because the SPYRUS Rosetta File Encryption extension to the SPYRUS Security In A Box product uses the same Microsoft S/MIME functionality that Outlook uses, the described method may be used to extend the Rosetta File Encryption utility to use Suite B. Other file encryption products may be extended in a similar manner.

Suite B Secure Instant Messaging

To the extent that Secure Instant Messaging, such as from AOL, Yahoo, and MSN all use an S/MIME paradigm for their security, the invention should be equally applicable.

Suite B Mobile Messaging

Mobile messaging that preserves the desktop-to-desktop paradigm of Outlook with S/MIME can be integrated directly into the Exchange server, and which will support a hardware token, will permit use of the invention.

Other Suite B Applications

Any application that uses RSA, including Outlook Express, Novell's GroupWise, PKZIP, Adobe Acrobat; various Secure Socket Layer (SSL) applications such as Internet Explorer and similar browsers and server, Virtual Private Network and other communications protocols such as internet protocol security (IPSEC), etc., could potentially make use of this invention.

CONCLUSIONS

A method and system has been described for deploying advanced cryptographic algorithms within a legacy framework or cryptographic interface that was not specifically designed for such algorithms but instead makes use of other algorithms of varying key sizes and types, whereby a purpose-built cryptographic interface of only minimal complexity is substituted for (part of) the default or other legacy interface in order to provide the new functionality.

Optionally, the cryptographic interface may be a proprietary interface such as the Microsoft Cryptographic Application Programming Interface (CAPI) Cryptographic Service Provider (CSP), the Public Key Cryptographic Standard #11 (PKCS#11), the FORTEZZA API and command set, RSA BSAFE, IBM Common Cryptographic Architecture, Novell International Cryptographic Infrastructure (NICI), and various other proprietary interfaces and command sets or other suitable interfaces.

Additionally, optionally a legacy public key algorithm is used to encrypt and securely transport a data object, or a legacy request to generate or use a particular cryptographic key and algorithm may be substituted or replaced with a different public key algorithm. Such public key algorithms to be replaced may be the Rivest-Shamir-Adleman (RSA) algorithm, the Key Exchange Algorithm (KEA), or the Diffie-Hellman or the Menezes-Qu-Vanstone algorithms.

Optionally, a legacy public key algorithm used to digitally sign a data object or a hash function may be replaced with a different public key algorithm and hash algorithm, such as where the public key algorithm is RSA and the hash function is MD2, MD4, MD5, or SHA-1 or similar construct is replaced with ECDSA in combination with SHA-256 or SHA-384, etc.

The replacement public key algorithm may be chosen to offer equivalent or better security with a significantly shorter key length and/or encrypted or digitally signed result. For example, it may make use of elliptic curve cryptography, one of the EC Diffie-Hellman key establishment operations, one of the ECMQV key establishment operations, or the ECIES key encryption operation. Additionally, optionally the public key encryption algorithm may make use of some other elliptic curve cryptographic algorithm, including proprietary and/or classified algorithms.

Optionally, the public key may be used to compute a digital signature. Further, optionally the digital signature is computed using the ECDSA signature algorithm, the EC-KCDSA signature algorithm, or by some other elliptic curve cryptographic algorithm, including proprietary and/or classified algorithms, either by themselves or in combination with various advanced hash functions.

The methods described may be used either singly or in combination, to provide either or both confidentiality and digital signatures in various combinations.

The methods described may be used where the public key operations are used to establish, transport, or otherwise securely communicate a symmetric key from an originator to one or more recipients, wherein the originator may be one of the recipients as well.

Optionally, the symmetric key algorithm may be the Data Encryption Standard (DES), or two-key or three-key triple-DES, or the SKIPJACK algorithm, or RC2, RC4, CAST, IDEA, TWOFISH, BLOWFISH, GOST, or another proprietary and/or classified algorithm.

The new, advanced, or replacement public key of the recipient or recipients may be conveyed or installed directly or indirectly to, by, or on behalf of the originator through a trusted process. Optionally, the new, advanced, or replacement public key is conveyed in a public key certificate (e.g., an X.509 or XML-encoded certificate) as a certificate attribute.

Both the old or legacy public key and the new, advanced, or replacement public key or keys may be conveyed in the public key certificate.

The new, advanced, or replacement public key may be conveyed in a separate Attribute Certificate that is linked, directly or indirectly, to the certificate that contains the legacy public key. Or, the new, advanced or replacement public key of a recipient may be directly embedded within an encoded field that purports to be the public key associated with the legacy algorithm.

The fact that the advanced public key is embedded in the legacy public key or certificate may be signaled to the cryptographic application or hardware by means of one or more indicators or attributes that are conveyed in the certificate that contains the legacy public key.

The fact that the advanced public key is embedded in the legacy public key or certificate may be signaled to the cryptographic application or hardware by means of a multiplicity of flag bits and/or a hash function result that are also embedded within the legacy public key.

The new, advanced, or replacement public key may be embedded within the legacy public key at the time of key generation through a watermarking technique, in such a manner as to allow the legacy public key algorithm to function and interoperate correctly with legacy systems, in addition to conveying the new, advanced, or replacement public key to those systems or applications which are prepared to recognize and handle it correctly.

The new, advanced, or replacement symmetric key algorithms may use a key length that is less than or equal to the legacy key length, e.g., AES-128 key is stronger, yet shorter, than a 168-bit triple-DES key.

The key that was generated for the legacy symmetric key can be truncated as required (with or without the deletion of any parity bits) and used for the new, advanced or replacement key directly.

An artificial identifier or "handle" of the same (or lesser) length and format as the legacy symmetric key may be created at the time the new, advanced, or replacement key is generated, and that identifier may be transferred to the cryptographic hardware or application in place of the legacy key, in such a manner as to cause the new, advanced or replacement cryptographic hardware or application to associate and locate the correct advanced key, in order to carry out the designated processes (encryption, decryption, or wrapping or encrypting the key using another symmetric or public key) in accordance with the appropriate method or protocol.

An artificial identifier or "handle" of the same (or lesser) length and format as the legacy hash result may be created at the time the new, advanced, or replacement hash result is computed, and that identifier is transferred to the cryptographic hardware or application in place of the legacy hash result, in such a manner as to cause the new, advanced or replacement cryptographic hardware or application to locate the correct advanced hash result, in order to carry out the designated processes (digital signing the hash result, Initialization Vector creation, nonce creation, or other purposes) in accordance with the appropriate method or protocol.

In one embodiment the proper operation of the legacy application requires that the legacy hash function be generated and processed correctly, and the new, advanced, or replacement hash function must be used, requiring the computation of both the legacy hash function and the advanced hash function, with the legacy hash function eventually being processed by the advanced cryptographic hardware or application as a handle.

The use of an artificial identifier or handle can be communicated to the consuming cryptographic application as though it were the symmetric key or hash result, while the real symmetric key and/or hash result is stored within a restricted access environment in order to prevent it from being compromised through exposure or modification.

Figure 9:
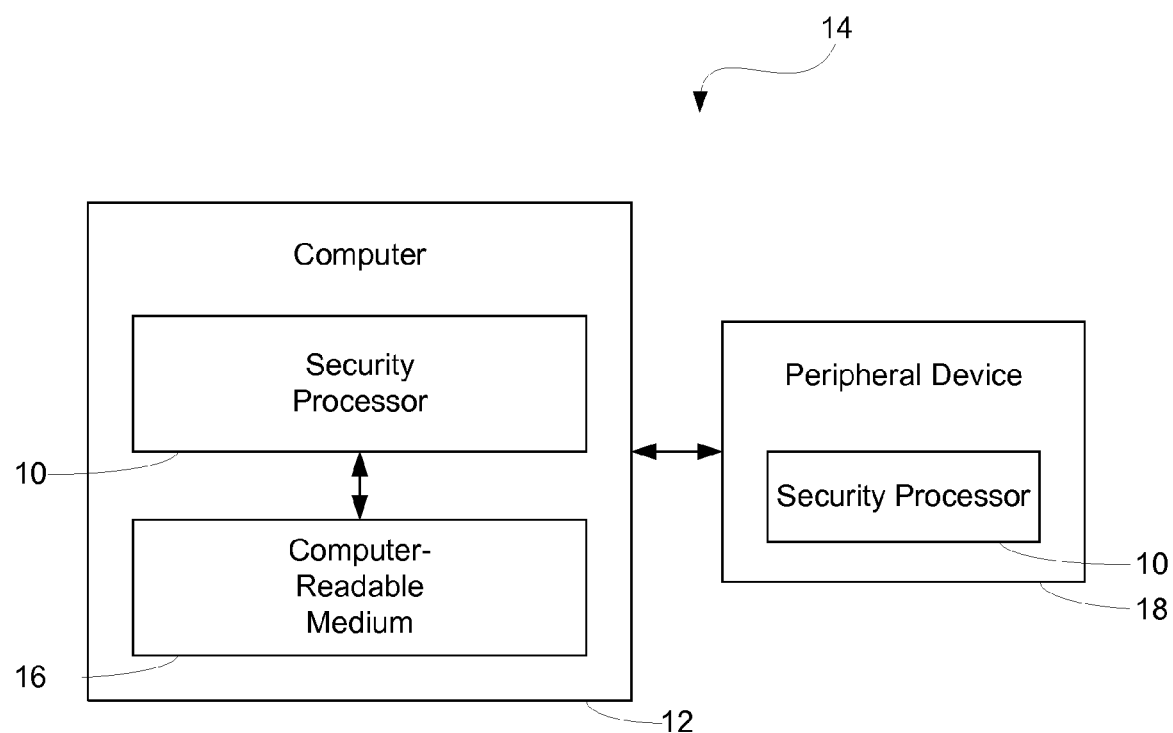
FIG. 9 is a block diagram of a data processing system according to a preferred embodiment.

Referring additionally to FIG. 9, the symmetric key and/or hash result may be generated or computed; processed or used; and subsequently stored, retrieved and/or ultimately destroyed or zeroized; all exclusively within the security boundary of a hardware or software security processor 10, which can be included within a computer 12 that is part of an electronic data processing (EDP) system 14, and that also includes a computer-readable medium 16 that is configured to store one or more programs that implement the algorithms and/or protocols that are discussed in this document.

The security processor 10 may be implemented within a peripheral device 18 such as smart card, a USB token, or an external hardware security module such as the SPYRUS Rosetta Series II smart card, Rosetta Series II USB token, the SPYRUS LYNKS Series II HSM, or the SPYRUS Hydra Privacy Card® Series II.

The security processor 10 may be implemented internally within the electronic data processing system 14, in the form of a Trusted Platform Module that is not easily removable or replaceable by the consumer without disassembling the EDP system and unsoldering or otherwise removing the components.

The encryption or key exchange protocol may require one or more of the following cryptographic parameters, any of which may be optional depending upon the particular cryptographic protocol employed:

The static encryption key (or an indirect reference thereto) of the originator;

An ephemeral key of the originator;

The static key (or an indirect reference thereto) of the recipient;

An ephemeral key of the recipient;

Other secret and/or public parameters that are input into a Key Derivation Function that operates upon a shared secret derived from the cryptographic protocol;

One or more Message Encryption Key, File Encryption Key, Session Key, or other similar symmetric keys that may be encrypted or wrapped in the Key Encryption Key derived from the Key Derivation Function;

An Initialization Vector;

An initial starting point and counter increment for counter-based mechanisms;

Various "tweaks," "spice," hash values, or other variables as may be used in certain encryption schemes and/or advanced hash functions; and/or Various flags, length counts, indicators, type fields, random padding fields, etc., as may be required to facilitate parsing the final result by the recipient, as well as conforming to common programming practices.

In some embodiments, the various cryptographic parameters that may be required are embedded in what would appear to be the result of an RSA key encryption operation. These parameters could actually be the result of an RSA key encryption operation, using the RSA public key of the recipient.

The advanced public key algorithm used for key exchange may be one of the various versions of EC Diffie-Hellman, ECMQV, or ECIES, utilizing ECC keys of an appropriate curve type and key strength, e.g., those standardized by recognized standards bodies, and/or other similar proprietary or classified algorithms.

The advanced symmetric key algorithm may be the Advanced Encryption Standard (AES), using 128, 192, or 256-bit key lengths, or other proprietary and/or classified symmetric key algorithms.

A digital signature may be computed where the protocol requires one or more of the following cryptographic variables:

The static signature key of the Signer, provided either directly or indirectly, e.g., through a reference to a particular key or a certificate containing a key;

The item itself, or a hash of the item to be signed, where the item is a message, a file, and/or text;

A secondary hash of the item to be signed, perhaps using a legacy hash algorithm where the item is a message, a file, and/or text;

The date, time, location, message counter, and/or other information pertaining to the digital signature, e.g., for non-repudiation or other purposes;

The conventional (r, s) outputs generated by the ECDSA signature scheme, among others, where r is effectively an ephemeral key, and s is the signature result;

A random per-message salt variable used as part of the hash calculation, which salt may be r, some derivative of r, or an independent variable, e.g., as suggested by A Framework for Iterative Hash Functions—HAIFA (c.f. http://csr.nist.gov/groups/ST/hash/documents/DUNKELMAN_NIST3.pdf) for improved hash Modes of Operation; and/or Various flags, length counts, indicators, type fields, random padding fields, etc., as may be required to facilitate parsing the final result by the recipient, as well as conforming to common programming practices.

The advanced digital signature mechanism may use elliptic curve cryptography (ECC). The ECC curve types, standard key lengths, and digital signature algorithms may be standardized by recognized standards bodies, e.g., ECDSA over the prime fields and key lengths of P-256, P-384, and/or P-521.

The advanced hash algorithm used may be one of those standardized by recognized standards bodies, e.g., SHA-224, SHA-256, SHA-384, and/or SHA-512.

The security of the basic hash algorithm may be enhanced through the use of additional parameters that may be involved in implementing a specialized hash Mode of Operation, and those additional parameters may be conveyed through the encapsulation scheme.

Key establishment and digital signature techniques can be used singly or in combination with respect to a single message, file, or session, or a multiplicity thereof.

A single message, file, or session, or multiples thereof, may be encrypted for consumption by a single recipient or by multiple recipients.

The encryption protocol and intended application may be for the protection of secure electronic mail, e.g., through the S/MIME protocol.

The encryption protocol and intended application may be for the establishment of a secure and/or authenticated channel or session over a lower level communications protocol e.g., as between a web browser and a server, using the common SSL or TLS protocol.

The encryption protocol and intended application may be for the establishment of a secure and/or authenticated channel or session over a basic communications layer, e.g., as between a client and a server or gateway to a Virtual Private Network, using the IPSEC protocol with an appropriate key management protocol such as Internet key exchange (IKE).

The encryption and/or signature protocols can be used in various combinations at various layers, and may include similar or derivative applications, including proprietary extensions thereto.

The legacy cryptographic algorithms and protocols that may be replaced/substituted include the Key Establishment Algorithm and Digital Signature Algorithm public key algorithms, the SKIPJACK symmetric key algorithm, and SHA-1 hash algorithm; as currently used within the Defense Message System.

Figure 10:
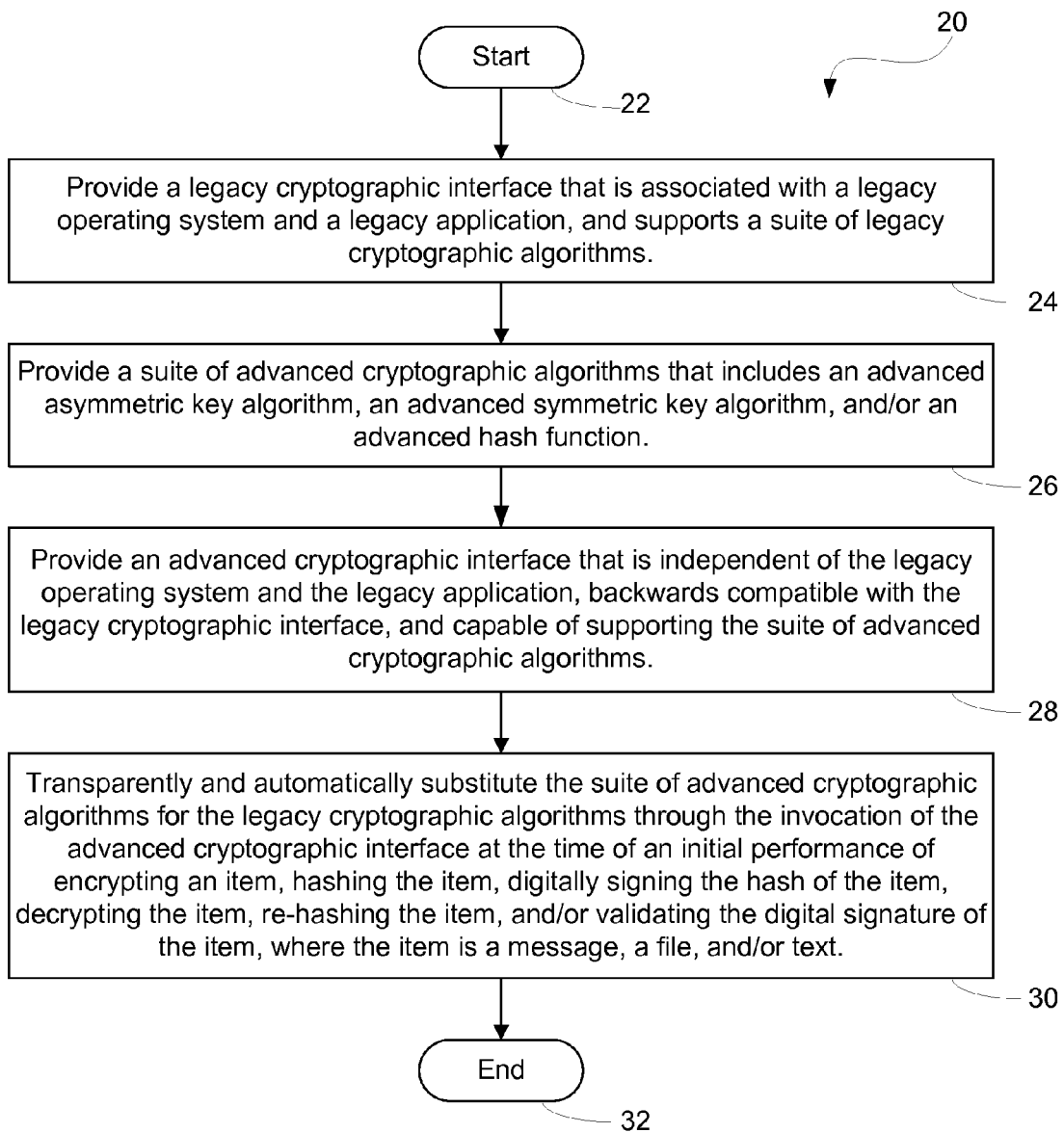
FIG. 10 is a flowchart for an example method for deploying advanced cryptographic algorithms according to the invention.

An exemplary method for deploying advanced cryptographic algorithms according to the present invention is illustrated in the algorithm 20 of FIG. 10. After starting, the method at step 22, the next step 24 is to provide a legacy cryptographic interface that is associated with a legacy operating system and a legacy application, and supports a suite of legacy cryptographic algorithms. Next, at step 26, a suite of advanced cryptographic algorithms is provided that includes an advanced asymmetric key algorithm, an advanced symmetric key algorithm, and/or an advanced hash function. At step 28, an advanced cryptographic interface is provided that is independent of the legacy operating system and the legacy application, backwards compatible with the legacy cryptographic interface, and capable of supporting the suite of advanced cryptographic algorithms. Next, at step 30, the suite of advanced cryptographic algorithms is transparently and automatically substituted for the legacy cryptographic algorithms through the invocation of the advanced cryptographic interface at the time of an initial performance of encrypting an item, hashing the item, digitally signing the hash of the item, decrypting the item, re-hashing the item, and/or validating the digital signature of the item, where the item is a message, a file, and/or text. The method ends at step 32.

All features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

We claim

1. A method for deploying a suite of advanced cryptographic algorithms, the method comprising:
   I. configuring at least one processor to perform the functions of:
   a. providing a legacy cryptographic interface that is associated with a legacy operating system and a legacy application, and supports a suite of legacy cryptographic algorithms;
   b. providing a suite of advanced cryptographic algorithms that includes one or more processes selected from the group consisting of an advanced asymmetric key algorithm, an advanced symmetric key algorithm, and an advanced hash function;
   c. providing an advanced cryptographic interface that is:
      i. independent of the legacy operating system and the legacy application,
      ii. backwards compatible with the legacy cryptographic interface, and
      iii. capable of supporting the suite of advanced cryptographic algorithms; and
   d. transparently augmenting the legacy cryptographic algorithms by automatically substituting the suite of advanced cryptographic algorithms through one or more processes,
      i. generating one or more than one advanced public/private key pair comprising one or more than one advanced public key, using the advanced asymmetric key algorithm;
      wherein the one or more than one advanced public/private key pair is associated with the legacy public/private key pair, substituted for the legacy public/private key pair, or both associated and substituted for the legacy public/private key pair;
      ii. generating one or more than one legacy public/private key pair, utilizing a watermarking process to construct one or more than one legacy private key and one or more than one legacy public key, such that the one or more than one legacy public key comprises one or more than one advanced public key embedded within the one or more than one legacy public key that is embedded within the legacy public key format, and retaining the cryptographic strength and functionality of the legacy public/private key pair for the relevant legacy public key operations,
where generating one or more than one legacy public/private key pair comprises using one or more of the legacy cryptographic algorithms;
iii. conveying one or more than one legacy public key and one or more than one embedded advanced public key to a recipient:
e. wherein invocation of the advanced cryptographic interface at the time of an initial performance of an operation is selected from the group consisting of encrypting an item, hashing the item, digitally signing the hash of the item, digitally signing the item itself, decrypting the item, re-hashing the item, validating the digital signature of the item and validating the digital signature of the hash of the item.

2. The method according to claim 1, wherein:
a. one or more of the legacy cryptographic algorithms is selected from the group consisting of:
i. an asymmetric key algorithm, a key transport algorithm, a key agreement algorithm,
ii. an asymmetric public key digital signature algorithm,
iii. a symmetric key algorithm, and
iv. a hash function, Message Authentication Code;
b. the legacy cryptographic interface is selected from the group consisting of the Microsoft Cryptographic Application Programming Interface (CAPI) Cryptographic Service Provider, the Public Key Cryptographic Standard #11 (PKCS#11), the FORTEZZA API and command set, RSA BSAFE, IBM Common Cryptographic Architecture (CCA), and Novell International Cryptographic Infrastructure (NICI); and
c. one or more of the suite of advanced cryptographic algorithms is selected from the group consisting of:
i. an asymmetric key algorithm, an asymmetric key transport algorithm, a key agreement algorithm, an Elliptic Curve Cryptography algorithm over GF(p), GF($2^n$), and Koblitz fields, Elliptic Curve Diffie-Hellman (EC-DH), Elliptic Curve Menezes-Qu-Vanstone (ECMQV), Elliptic Curve Integrated Encryption Scheme (ECIES), Provably Secure Encryption Curve Scheme (PSEC), Elliptic Curve Station to Station Protocol,
ii. an asymmetric public key digital signature algorithm, Elliptic Curve Digital Signature Algorithm (ECDSA), Elliptic Curve Korean Certificate-based Digital Signature Algorithm (EC-KCDSA), Elliptic-Curve Pintsov-Vanstone Signatures (ECPVS),
iii. a symmetric key algorithm, and
iv. a hash function.

3. The method according to claim 1, wherein:
at least one of the suite of legacy cryptographic algorithms has associated with it a legacy asymmetric public/private key pair that includes a legacy private key.

4. The method of claim 3, wherein the method further optionally comprises the steps of:
a) providing a hash function, and
b) using the legacy private key to digitally sign the hash function.

5. The method according to claim 1, wherein:
a. at least one of the suite of legacy cryptographic algorithms has associated with it a legacy asymmetric public/private key pair that includes a legacy public key and a legacy private key; and
b. the method further comprises:
i. providing a legacy symmetric key algorithm that has associated with it a legacy symmetric key, and
ii. performing an action selected from the group consisting of:
A. using the legacy public key to directly encrypt the legacy symmetric key,
B. doing the following:
I. providing a legacy private key that is associated with a first party (the originator) at the time of encryption,
II. providing a legacy public key that is associated with a second party (a recipient), and
III. using the legacy public key of the recipient together with the legacy private key of the originator at the time of encryption to securely negotiate or agree upon a key to be shared between the originator and the recipient, either directly or through the use of Derived Keying material and a Key Derivation Function,
C. using the legacy private key to directly decrypt the legacy symmetric key, and
D. doing the following:
I. providing a legacy public key that is associated with a first party (the originator) at the time of decryption,
II. providing a legacy private key that is associated with a second party (a recipient), and
III. using the legacy private key of the recipient together with the legacy public key of the originator at the time of decryption to securely negotiate or agree upon a key to be shared between the originator and the recipient, either directly or through the use of Derived Keying material and a Key Derivation Function.

6. The method according to claim 1, wherein the one or more processes includes an advanced asymmetric key algorithm and an advanced hash function, and the method further comprises:
a. using the advanced asymmetric key algorithm to generate an advanced public key and an advanced private key;
b. optionally applying the advanced hash function to the item to produce a hash function result; and
c. computing a digital signature using the advanced asymmetric key algorithm and the advanced private key together with the hash function result, wherein the digital signature can be validated by use of the corresponding advanced public key
d. computing a digital signature using the advanced asymmetric key algorithm and digitally signing the item, wherein the digital signature can be validated by use of the corresponding advanced public key.

7. The method according to claim 1, wherein:
a. the one or more processes includes an advanced asymmetric key algorithm that has associated with it an advanced public key and an advanced private key; and
b. the method further comprises:
i. providing an advanced asymmetric key algorithm, and
ii. using the advanced public key that is associated with a second party (a recipient) together with the advanced private key that is associated with a first party (the originator) at the time of encryption, and correspondingly the advanced private key of the recipient together with the advanced public key of the originator at the time of decryption, to securely negotiate or agree upon an advanced symmetric key to be shared between the originator and the recipient, either directly or through the use of Derived Keying material and a Key Derivation Function.

8. The method according to claim 1, wherein the one or more processes includes an advanced asymmetric key algorithm, and the method further comprises:
  a. using the advanced asymmetric key algorithm to generate an advanced public key, where the advanced public key is embedded in a public key certificate; and
  b. signaling that the advanced public key is embedded in the public key certificate using another item that is included in the public key certificate, where the another item is selected from the group consisting of an indicator, an attribute, a flag, and a hash function.

9. The method according to claim 1, wherein the one or more processes includes an advanced asymmetric key algorithm, and the method further comprising the steps of:
  a. generating one or more than one legacy public/private key pair comprising one or more than one legacy public key using one of the suite of legacy cryptographic algorithms;
  b. generating one or more than one advanced public/private key pair comprising one or more than one advanced public key using the advanced asymmetric key algorithm;
  c. providing a watermarking technique; and
  d. embedding the advanced public key within the one or more than one legacy public key using the watermarking technique while preserving the cryptographic strength and functionality of the legacy public key.

10. The method according to claim 1, wherein the one or more processes includes an advanced asymmetric key algorithm, and the method further comprises:
  a. using one of the suite of legacy cryptographic algorithms to generate a legacy public/private key pair that includes a legacy public key that is associated with a Certification Authority;
  b. using the advanced asymmetric key algorithm to generate an advanced public/private key pair that includes an advanced public key, wherein the advanced public/private key pair is to be used in association with, or substituted for, the legacy public/private key pair;
  c. conveying both the legacy public key and the advanced public key to a recipient wherein:
    i. the advanced public key is conveyed to the recipient in another item selected from the group consisting of a certificate attribute extension containing the advanced public key and included within a standard public key certificate containing the legacy public key, a separate Attribute Certificate that is linked to the standard public key certificate, and an encoded field, and
    ii. if the another item is a certificate attribute extension, the standard public key certificate is selected from the group consisting of an X.509 certificate and an XML-encoded certificate; and
  d. signing either the standard public key certificate or the Attribute Certificate using the legacy public key associated with the Certification Authority so as to satisfy certificate path validation and revocation checking constraints and practices of the Certification Authority.

11. The method according to claim 1, further comprising:
  a. providing a random or pseudo-random number generator;
  b. using the random or pseudo-random number generator to generate a legacy symmetric key; and
  c. forming an advanced symmetric key by a process selected from the group consisting of truncating the legacy symmetric key and hashing the legacy symmetric key using a hash function resulting in a shorter key length.

12. The method according to claim 1, wherein the one or more processes includes an advanced asymmetric key algorithm, and the method further comprises:
  a. using one of the suite of legacy cryptographic algorithms to generate a legacy public/private key pair that includes a legacy public key;
  b. using the advanced asymmetric key algorithm to generate an advanced public/private key pair that includes an advanced public key; and
  c. associating the legacy public key with the advanced public key.

13. The method according to claim 1, wherein:
  a. the legacy cryptographic interface includes a legacy protocol selected from the group consisting of an encryption protocol, a key transport protocol, a key exchange protocol, and a key agreement protocol;
  b. the legacy protocol requires one or more cryptographic parameters selected from the group consisting of an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and random padding fields;
  c. the advanced cryptographic interface includes and supports an advanced protocol selected from the group consisting of an encryption protocol, a key transport protocol, a key exchange protocol, and a key agreement protocol;
  d. the advanced protocol requires one or more cryptographic parameters selected from the group consisting of an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and random padding fields; and
  e. wherein the advanced cryptographic interface and at least one of the suite of advanced cryptographic algorithms respectively can be substituted for the legacy cryptographic interface and at least one of the suite of legacy cryptographic algorithms in a transparent manner, where the substitution is at least as cryptographically strong as the legacy algorithm.

14. The method according to claim 1, further comprising:
  a. computing a legacy digital signature using a first protocol that requires a variable selected from the group consisting of the item that is to be signed, a hash of the item that is to be signed, a secondary hash of the item that is to be signed, a date of the digital signature, a time of the digital signature, a location of the digital signature, a message counter, and a unique value that is associated with the item that is to be signed;

b. wherein:
  i. the advanced cryptographic interface includes and supports:
     A. a second cryptographic protocol, and
     B. advanced digital signature components selected from the group consisting of conventional (r,s) outputs generated by an ECDSA signature scheme where r is effectively an ephemeral key and s is the signature result computed by hashing one or more variables selected from the group consisting of a hash of the item that is to be signed, a secondary hash of the item that is to be signed, a date of the digital signature, a time of the digital signature, a location of the digital signature, a message counter, a unique value that is associated with the item that is to be signed, a random per-message salt variable used as part of a hash calculation, a flag, a length count, an indicator, a type field, and a random padding field, and
  ii. the advanced cryptographic interface, one of the advanced digital signature cryptographic algorithms, and one or more of the advanced digital signature components, respectively can be substituted for the legacy cryptographic interface and at least one of the suite of legacy cryptographic algorithms in a transparent manner.

15. The method of claim 1, where the step of generating one or more than one legacy public/private key pair, utilizing a watermarking process further comprises generating one or more than one legacy public/private key pair combined with flags, hash values, lengths codes, or other indicators intended to convey to the recipient the fact that said advanced public key algorithm key(s) is embedded within the legacy public key format and optionally retaining the functionality of the legacy public/private key pair for the relevant legacy public key operations.

16. The method of claim 1, where the step of conveying one or more than one legacy public key and one or more than one embedded advanced public key to a recipient further comprises the steps of:
  a) conveying one or more than one advanced public key to the recipient by presenting the one or more than one legacy public key and extracting the one or more than one legacy public key from a certificate in an industry standard manner
  b) conveying one or more than one advanced public key to the recipient by presenting the one or more than one legacy public key and extracting the one or more than one legacy public key from a certificate in a non-standard manner.
  c) extracting the one or more than one legacy public key from a standard public key certificate; and
  d) extracting the one or more than one legacy public key from a non-standard public key certificate.

17. The method of claim 16, where the steps of conveying one or more than one advanced public key to the recipient by presenting the one or more than one legacy public key and extracting the one or more than one legacy public key from a certificate in the standard manner and the non-standard manner includes direct key injection.

18. The method of claim 16, where steps of extracting the one or more than one legacy public key from a standard public key certificate and a non-standard public key certificate is selected from the group consisting of an X.509 certificate, and an XML-encoded certificate.

19. The method of claim 1, optionally comprising the step of signing a standard public key certificate comprising the one or more than one legacy public key, including the one or more than one embedded advanced public key binding both the legacy and the advanced keys to a Distinguished Name of a user and/or the other attributes contained within the certificate, using the legacy public key associated with the Certification Authority to satisfy certificate path validation and revocation checking constraints and practices of the Certification Authority.

20. The method of claim 1, further comprising the step of optionally signing a standard public key certificate containing the one or more than one legacy public key, including the one or more than one embedded advanced public key; thereby binding both the one or more than one legacy key and the one or more than one advanced key to a Distinguished Name of a user and other attributes contained within the certificate, whereby using the one or more than one legacy public key associated with the Certification Authority satisfies certificate path validation and revocation checking constraints and practices of the Certification Authority.

21. A system comprising:
  a security processor that supports a suite of advanced cryptographic algorithms and is configured to perform the functions of:
  a. provide a legacy cryptographic interface that is associated with a legacy operating system and a legacy application, and supports a suite of legacy cryptographic algorithms;
  b. provide a suite of advanced cryptographic algorithms that includes one or more processes selected from the group consisting of an advanced asymmetric key algorithm, an advanced symmetric key algorithm, and an advanced hash function;
  c. provide an advanced cryptographic interface that is:
     i. independent of the legacy operating system and the legacy application,
     ii. backwards compatible with the legacy cryptographic interface, and
     iii. capable of supporting the suite of advanced cryptographic algorithms; and
  d. transparently and automatically augment the legacy cryptographic algorithms by automatically substituting the suite of advanced cryptographic algorithms through one or more processes,
     i. generating one or more than one advanced public/private key pair comprising one or more than one advanced public key, using the advanced asymmetric key algorithm;
     wherein the one or more than one advanced public/private key pair is associated with the legacy public/private key pair, substituted for the legacy public/private key pair, or both associated and substituted for the legacy public/private key pair;
     ii. generating one or more than one legacy public/private key pair, utilizing a watermarking process to construct one or more than one legacy private key and one or more than one legacy public key, such that the one or more than one legacy public key comprises one or more than one advanced public key embedded within the one or more than one legacy public key that is embedded within the legacy public key format, and retaining the cryptographic strength and functionality of the legacy public/private key pair for the relevant legacy public key operations,
     where generating one or more than one legacy public/private key pair comprises using one or more of the legacy cryptographic algorithms;

iii. conveying one or more than one legacy public key and one or more than one embedded advanced public key to a recipient wherein:
e. wherein invocation of the advanced cryptographic interface at the time of an initial performance of an operation is selected from the group consisting of encrypting an item, hashing the item, digitally signing the hash of the item, decrypting the item, re-hashing the item, and validating the digital signature of the item.

22. The system according to claim 21, wherein the security processor including the suite of advanced cryptographic algorithms and their associated private keys, other Critical Security Parameters, and any derived keying material are implemented in and confined to a hardware device selected from the group consisting of:
   a. a separate removable hardware device; and
   b. a Trusted Platform Module.

23. The system of claim 22, where the Trusted Platform Module is external to a host device and cannot be easily disabled or removed from the host device.

24. The system of claim 22, where the Trusted Platform Module is embedded in a host device.

25. The system of claim 22, where the Trusted Platform Module is embedded in a host device and cannot be easily disabled or removed from the host device.

26. The system of claim 22, where the Trusted Platform Module is selected from the group consisting of a computer, a computing device, and a communications device.

27. The system according to claim 21, wherein the security processor is implemented in a hybrid fashion having a characteristic selected from the group consisting of:
   a. the security processor and the suite of advanced cryptographic algorithms and their associated private keys, other Critical Security Parameters, and any derived keying material are implemented in and confined to a separate removable hardware device;
   b. the security processor and the suite of advanced cryptographic algorithms and their associated private keys, other Critical Security Parameters, and any derived keying material are implemented in a Trusted Platform Module; and
   c. the advanced hashing function, the advanced symmetric key algorithm, keys, and encryption operations, and the digital signature verification functions can be performed in or on a module selected from the group consisting of:
      i. a host device selected from the group consisting of a computer, a host computing device, and a communication device, and
      ii. one or more software modules, making use of a suitable communications interface between the host device and the one or more software modules.

28. The system of claim 27, where the Trusted Platform Module is external to a host device and cannot be easily disabled or removed from the host device.

29. The system of claim 27, where the Trusted Platform Module is embedded in a host device.

30. The system of claim 27, where the Trusted Platform Module is embedded in a host device and cannot be easily disabled or removed from the host device.

31. The system according to claim 21, wherein:
   a. the security processor is implemented in software; and
   b. all of the advanced interfaces, cryptographic algorithms, keys, and other variables are implemented in one or more software modules.

32. The system according to claim 21, wherein the one or more processes includes an advanced asymmetric key algorithm and an advanced hash function, and the security processor is further configured to do the following:
   a. use the advanced asymmetric key algorithm to generate an advanced public key and an advanced private key;
   b. apply the advanced hash function to the item selected from the group consisting of a message, a file, and text to produce a hash function result; and
   c. compute a digital signature using the advanced asymmetric key algorithm and the advanced private key together with the hash function result, wherein the digital signature can be validated by use of the corresponding advanced public key.

33. The system according to claim 21, wherein:
   a. the one or more processes includes an advanced asymmetric key algorithm that has associated with it an advanced public key and an advanced private key; and
   b. the method further comprises:
      i. providing an advanced asymmetric key algorithm, and
      ii. using the advanced public key that is associated with a second party (a recipient) together with the advanced private key that is associated with a first party (the originator) at the time of encryption, and correspondingly the advanced private key of the recipient together with the advanced public key of the originator at the time of decryption, to securely negotiate or agree upon an advanced symmetric key to be shared between the originator and the recipient, either directly or through the use of Derived Keying material and a Key Derivation Function.

34. The system according to claim 21, wherein the one or more processes includes an advanced asymmetric key algorithm, and the security processor is further configured to do the following:
   a. use the advanced asymmetric key algorithm to generate an advanced public key, where the advanced public key is embedded in a public key certificate; and
   b. signal that the advanced public key is embedded in the public key certificate using another item that is included in the public key certificate, where the another item is selected from the group consisting of an indicator, an attribute, a flag, and a hash function.

35. A system according to claim 21, wherein the one or more processes includes an advanced asymmetric key algorithm, and the security processor is further configured to do the following:
   a. use one of the suite of legacy cryptographic algorithms to generate a legacy public/private key pair that includes a legacy public key that is associated with a Certification Authority;
   b. use the advanced asymmetric key algorithm to generate an advanced public/private key pair that includes an advanced public key, wherein the advanced public/private key pair is to be used in association with, or substituted for, the legacy public/private key pair;
   c. convey both the legacy public key and the advanced public key to a recipient wherein:
      i. the advanced public key is conveyed to the recipient in another item selected from the group consisting of a certificate attribute extension containing the advanced public key and included within a standard public key certificate containing the legacy public key, a separate Attribute Certificate that is linked to the standard public key certificate, and an encoded field, and ii. if the another item is a certificate attribute extension, the standard public key certificate is selected from the group consisting of an X.509 certificate and an XML-encoded certificate; and d. sign either the standard public key certificate or the Attribute Certificate using the legacy public key associated with the Certification Authority so as to satisfy certificate path validation and revocation checking constraints and practices of the Certification Authority.

36. A system according to claim 21, wherein:

a. the legacy cryptographic interface includes a legacy protocol selected from the group consisting of an encryption protocol, a key transport protocol, a key exchange protocol, and a key agreement protocol;

b. the legacy protocol requires one or more cryptographic parameters selected from the group consisting of an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and random padding fields;

c. the advanced cryptographic interface includes and supports an advanced protocol selected from the group consisting of an encryption protocol, a key transport protocol, a key exchange protocol, and a key agreement protocol;

d. the advanced protocol requires one or more cryptographic parameters selected from the group consisting of an originator's static encryption key, an originator's ephemeral key, a recipient's static key, a recipient's ephemeral key, parameters that are input to a key derivation function that operates on a shared secret that is derived from a cryptographic protocol, a key that can be encrypted or wrapped in a key encryption key that is derived from the key derivation function, an initialization vector, an initial starting point and counter increment for counter-based mechanisms, variables, flags, length counts, indicators, type fields, and random padding fields; and e. wherein the advanced cryptographic interface and at least one of the suite of advanced cryptographic algorithms respectively can be substituted for the legacy cryptographic interface and at least one of the suite of legacy cryptographic algorithms in a transparent manner.

37. A system according to claim 21, wherein the security processor is further configured to do the following:

a. compute a legacy digital signature using a first protocol that requires a variable selected from the group consisting of the item that is to be signed, a hash of the item that is to be signed, a secondary hash of the item that is to be signed, a date of the digital signature, a time of the digital signature, a location of the digital signature, a message counter, and a unique value that is associated with the item that is to be signed;

b. wherein:

i. the advanced cryptographic interface includes and supports:

A. a second protocol, and

B. advanced digital signature components selected from the group consisting of conventional (r,s) outputs generated by an ECDSA signature scheme where r is effectively an ephemeral key and s is the signature result computed by hashing one or more variables selected from the group consisting of a hash of the item that is to be signed, a secondary hash of the item that is to be signed, a date of the digital signature, a time of the digital signature, a location of the digital signature, a message counter, a unique value that is associated with the item that is to be signed, a random per-message salt variable used as part of a hash calculation, a flag, a length count, an indicator, a type field, and a random padding field, and ii. the advanced cryptographic interface, one of the advanced digital signature cryptographic algorithms, and one or more of the advanced digital signature components, respectively can be substituted for the legacy cryptographic interface and at least one of the suite of legacy cryptographic algorithms in a transparent manner.

* * * * *